United States Patent
Gallagher et al.

(10) Patent No.: US 7,454,207 B2
(45) Date of Patent: *Nov. 18, 2008

(54) SERVICE ACCESS CONTROL INTERFACE FOR AN UNLICENSED WIRELESS COMMUNICATION SYSTEM

(75) Inventors: Michael D. Gallagher, San Jose, CA (US); Rajeey Gupta, Sunnyvale, CA (US); Swaran Singh Sethi, San Jose, CA (US); Amit Khetawat, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,645

(22) Filed: Aug. 6, 2007

(65) Prior Publication Data

US 2008/0057908 A1  Mar. 6, 2008

Related U.S. Application Data

(63) Continuation of application No. 11/349,024, filed on Feb. 6, 2006, now Pat. No. 7,272,397, and a continuation-in-part of application No. 11/129,134, filed on May 12, 2005, and a continuation-in-part of application No. 10/688,470, filed on Oct. 17, 2003, now Pat. No. 7,127,250.

(60) Provisional application No. 60/722,936, filed on Sep. 29, 2005, provisional application No. 60/649,977, filed on Feb. 4, 2005.

(51) Int. Cl.
  *H04Q 7/20* (2006.01)
(52) U.S. Cl. ............ 455/435.1; 455/432.1; 455/436; 370/331; 370/338; 370/352
(58) Field of Classification Search ............ 455/448, 455/446, 432.2, 426.1, 41.2, 435.1, 432.1; 370/331, 328, 352, 401, 338
See application file for complete search history.

(56) References Cited

U.S. PATENT DOCUMENTS 5,101,501 A    3/1992  Gilhousen et al.

(Continued)

FOREIGN PATENT DOCUMENTS

EP    0936777 A1    8/1999

(Continued)

OTHER PUBLICATIONS

Non-Final Office Action of U.S. Appl. No. 10/115,767, Dec. 22, 2005 (mailing date), Jahangir Mohammed.

(Continued)

*Primary Examiner*—George Eng
*Assistant Examiner*—Brandon J Miller
(74) *Attorney, Agent, or Firm*—Adeli & Tollen LLP

(57) ABSTRACT

Some embodiments provide a system for authorization and authentication of an unlicensed mobile access (UMA) subscriber. The system includes an UMA network controller (UNC) which is communicatively coupled to a licensed wireless communication system. The system also includes an access point (AP) that serves a wireless local area network (WLAN). The system further includes a mobile station (MS) that is communicatively coupled to the AP and the licensed wireless communication system. The system also includes an authentication server that is communicatively coupled to the UNC. The authentication server authenticates a UMA subscriber for accessing an unlicensed mobile access network (UMAN) that includes the UNC and the AP. Some embodiments define an interface between the UNC and the authentication server uses Remote Access Dial-In User Service (RADIUS) protocol. In some embodiments, the authentication server is an Authorization, Authentication, and Accounting (AAA) server.

25 Claims, 5 Drawing Sheets

U.S. PATENT DOCUMENTS

| | | | |
|---|---|---|---|
| 5,109,528 A | 4/1992 | Uddenfeldt | |
| 5,226,045 A | 7/1993 | Chuang | |
| 5,235,632 A | 8/1993 | Raith | |
| 5,260,944 A | 11/1993 | Tomabechi | |
| 5,260,988 A | 11/1993 | Schellineig et al. | |
| 5,267,261 A | 11/1993 | Blakeney, II et al. | |
| 5,367,558 A | 11/1994 | Gillis et al. | |
| 5,390,233 A | 2/1995 | Jensen et al. | |
| 5,392,331 A | 2/1995 | Patsiokas et al. | |
| 5,406,615 A | 4/1995 | Miller et al. | |
| 5,428,601 A | 6/1995 | Owen | |
| 5,442,680 A | 8/1995 | Schellinger et al. | |
| 5,445,619 A | 8/1995 | Burns | |
| 5,448,619 A | 9/1995 | Evans et al. | |
| 5,507,035 A | 4/1996 | Bantz et al. | |
| 5,533,027 A | 7/1996 | Akerberg et al. | |
| 5,594,782 A | 1/1997 | Zicker et al. | |
| 5,610,969 A | 3/1997 | McHenry | |
| 5,634,193 A | 5/1997 | Ghisler | |
| 5,640,414 A | 6/1997 | Blakeney, II et al. | |
| 5,659,598 A | 8/1997 | Byrne | |
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison et al. | |
| 5,796,729 A | 8/1998 | Greaney et al. | |
| 5,815,525 A | 9/1998 | Smith | |
| 5,818,820 A | 10/1998 | Anderson et al. | |
| 5,822,681 A | 10/1998 | Chang et al. | |
| 5,825,759 A | 10/1998 | Liu | |
| 5,852,767 A | 12/1998 | Sugita | |
| 5,870,677 A | 2/1999 | Takahashi et al. | |
| 5,887,020 A | 3/1999 | Smith et al. | |
| 5,887,260 A | 3/1999 | Nakata | |
| 5,890,055 A | 3/1999 | Chu et al. | |
| 5,890,064 A | 3/1999 | Widergen et al. | |
| 5,903,834 A | 5/1999 | Wallstedt et al. | |
| 5,915,224 A | 6/1999 | Jonsson | |
| 5,926,760 A | 7/1999 | Khan et al. | |
| 5,936,949 A | 8/1999 | Pasternak et al. | |
| 5,940,512 A | 8/1999 | Tomoike | |
| 5,946,622 A | 8/1999 | Bojeryd | |
| 5,949,773 A | 9/1999 | Bhalla et al. | |
| 5,960,341 A | 9/1999 | LeBlanc et al. | |
| 5,995,828 A | 11/1999 | Nishida | |
| 6,016,318 A | 1/2000 | Tomoike | |
| 6,035,193 A | 3/2000 | Buhrmann et al. | |
| 6,052,592 A | 4/2000 | Schellinger et al. | |
| 6,101,176 A | 8/2000 | Honkasalo | |
| 6,112,080 A | 8/2000 | Anderson et al. | |
| 6,112,088 A | 8/2000 | Haartsen | |
| 6,119,000 A | 9/2000 | Stephenson et al. | |
| 6,130,886 A | 10/2000 | Ketseoglou et al. | |
| 6,134,227 A | 10/2000 | Magana | |
| 6,138,019 A | 10/2000 | Trompower et al. | |
| 6,226,515 B1 | 5/2001 | Pauli | |
| 6,236,852 B1 | 5/2001 | Veerasamy et al. | |
| 6,243,581 B1 | 6/2001 | Jawanda | |
| 6,256,511 B1 | 7/2001 | Brown | |
| 6,263,211 B1 | 7/2001 | Brunner | |
| 6,269,086 B1 | 7/2001 | Magana et al. | |
| 6,320,873 B1 | 11/2001 | Nevo et al. | |
| 6,327,470 B1 | 12/2001 | Ostling | |
| 6,359,872 B1 | 3/2002 | Mahany et al. | |
| 6,374,102 B1 | 4/2002 | Brachman et al. | |
| 6,381,457 B1 | 4/2002 | Carlsson et al. | |
| 6,389,059 B1 | 5/2002 | Smith et al. | |
| 6,415,158 B1 | 7/2002 | King et al. | |
| 6,430,395 B2 | 8/2002 | Arazi et al. | |
| 6,445,921 B1 | 9/2002 | Bell | |
| 6,463,307 B1 | 10/2002 | Larsson et al. | |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo et al. | |
| 6,633,761 B1 | 10/2003 | Singhal | |
| 6,643,512 B1 | 11/2003 | Ramaswamy | |
| 6,647,426 B2 | 11/2003 | Mohammed | |
| 6,658,250 B1 | 12/2003 | Ganesan et al. | |
| 6,665,276 B1 | 12/2003 | Culbertson et al. | |
| 6,675,009 B1 | 1/2004 | Cook | |
| 6,680,923 B1 | 1/2004 | Leon | |
| 6,708,033 B1 | 3/2004 | Linkola et al. | |
| 6,711,400 B1 | 3/2004 | Aura | |
| 6,766,160 B1 | 7/2004 | Lemilainen | |
| 6,788,656 B1 | 9/2004 | Smolentzov et al. | |
| 6,795,701 B1 * | 9/2004 | Baker et al. | 455/411 |
| 6,801,519 B1 | 10/2004 | Mangel | |
| 6,801,772 B1 | 10/2004 | Townend et al. | |
| 6,801,777 B2 | 10/2004 | Rusch | |
| 6,807,417 B2 | 10/2004 | Sallinen | |
| 6,824,048 B1 | 11/2004 | Itabashi et al. | |
| 6,826,154 B2 | 11/2004 | Subbiah et al. | |
| 6,829,227 B1 | 12/2004 | Pitt | |
| 6,842,462 B1 | 1/2005 | Ramjee et al. | |
| 6,845,095 B2 | 1/2005 | Krishnarajah et al. | |
| 6,895,255 B1 | 5/2005 | Bridgelall | |
| 6,909,705 B1 | 6/2005 | Lee et al. | |
| 6,922,559 B2 | 7/2005 | Mohammed | |
| 6,925,074 B1 * | 8/2005 | Vikberg et al. | 370/338 |
| 6,937,862 B2 | 8/2005 | Back et al. | |
| 6,970,719 B1 | 11/2005 | McConnell et al. | |
| 6,993,359 B1 | 1/2006 | Nelakanti et al. | |
| 7,009,952 B1 | 3/2006 | Razavilar et al. | |
| 7,039,025 B1 * | 5/2006 | Menon et al. | 370/328 |
| 7,099,339 B1 * | 8/2006 | Wang et al. | 370/401 |
| 7,272,397 B2 * | 9/2007 | Gallagher et al. | 455/436 |
| 7,283,822 B2 * | 10/2007 | Gallagher et al. | 455/436 |
| 2001/0029186 A1 | 10/2001 | Canyon et al. | |
| 2001/0031645 A1 | 10/2001 | Jarrett | |
| 2001/0046860 A1 | 11/2001 | Lee | |
| 2001/0049790 A1 | 12/2001 | Faccin et al. | |
| 2002/0045459 A1 | 4/2002 | Morikawa | |
| 2002/0066036 A1 | 5/2002 | Makineni | |
| 2002/0075844 A1 | 6/2002 | Hagen | |
| 2002/0082015 A1 | 6/2002 | Wu | |
| 2002/0083344 A1 | 6/2002 | Vairavan | |
| 2002/0085516 A1 | 7/2002 | Bridgelall | |
| 2002/0102974 A1 | 8/2002 | Raith | |
| 2002/0118674 A1 | 8/2002 | Faccin et al. | |
| 2002/0131387 A1 * | 9/2002 | Pitcher et al. | 370/338 |
| 2002/0132630 A1 | 9/2002 | Arazi et al. | |
| 2002/0142761 A1 | 10/2002 | Wallstedt et al. | |
| 2002/0147008 A1 | 10/2002 | Kallio | |
| 2002/0147016 A1 | 10/2002 | Arazi et al. | |
| 2002/0155829 A1 | 10/2002 | Proctor, Jr. et al. | |
| 2002/0160811 A1 | 10/2002 | Jannette et al. | |
| 2002/0161905 A1 | 10/2002 | Haverinen et al. | |
| 2002/0164984 A1 | 11/2002 | Thakker | |
| 2002/0166068 A1 | 11/2002 | Kilgore | |
| 2002/0191575 A1 | 12/2002 | Kalavade et al. | |
| 2002/0191596 A1 | 12/2002 | Moyano et al. | |
| 2002/0197984 A1 | 12/2002 | Monin et al. | |
| 2003/0007475 A1 | 1/2003 | Tsuda et al. | |
| 2003/0031151 A1 | 2/2003 | Sharma et al. | |

| | | |
|---|---|---|
| 2003/0043773 A1 | 3/2003 | Chang |
| 2003/0087653 A1 | 5/2003 | Leung |
| 2003/0112789 A1 | 6/2003 | Heinonen |
| 2003/0119480 A1 | 6/2003 | Mohammed |
| 2003/0119490 A1 | 6/2003 | Mohammed |
| 2003/0119527 A1 | 6/2003 | Labun |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil |
| 2003/0154306 A1 | 8/2003 | Perry |
| 2003/0176186 A1 | 9/2003 | Mohammed |
| 2003/0193952 A1 | 10/2003 | O'Neill |
| 2003/0210199 A1 | 11/2003 | Sward et al. |
| 2003/0219024 A1 | 11/2003 | Purnadai et al. |
| 2004/0003060 A1 | 1/2004 | Asoh et al. |
| 2004/0008649 A1 | 1/2004 | Wybenga |
| 2004/0009749 A1 | 1/2004 | Arazi et al. |
| 2004/0013099 A1 | 1/2004 | O'Neill |
| 2004/0037312 A1 | 2/2004 | Spear |
| 2004/0053623 A1 | 3/2004 | Hoff et al. |
| 2004/0068571 A1 | 4/2004 | Ahmavarra |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0116120 A1 | 6/2004 | Mohammed et al. |
| 2004/0147223 A1 | 7/2004 | Cho |
| 2004/0171378 A1 | 9/2004 | Rautila |
| 2004/0192211 A1 | 9/2004 | Gallagher et al. |
| 2004/0202132 A1 | 10/2004 | Heinonen |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2005/0064896 A1 | 3/2005 | Rautiola et al. |
| 2005/0101245 A1 | 5/2005 | Ahmavaara |
| 2005/0101329 A1 | 5/2005 | Gallagher |
| 2005/0181805 A1 | 8/2005 | Gallagher |
| 2005/0186948 A1 | 8/2005 | Gallagher |
| 2005/0198199 A1 | 9/2005 | Dowling |
| 2005/0207395 A1 | 9/2005 | Mohammed |
| 2005/0210154 A1 | 9/2005 | Verma et al. |
| 2005/0239441 A1 | 10/2005 | Eronen |
| 2005/0255879 A1 | 11/2005 | Shi |
| 2005/0265279 A1 | 12/2005 | Markovic et al. |
| 2005/0266853 A1 | 12/2005 | Gallagher |
| 2005/0271008 A1 | 12/2005 | Gallagher |
| 2005/0272424 A1 | 12/2005 | Gallagher |
| 2005/0272449 A1 | 12/2005 | Gallagher |
| 2006/0009201 A1 | 1/2006 | Gallagher |
| 2006/0009202 A1 | 1/2006 | Gallagher |
| 2006/0019656 A1 | 1/2006 | Gallagher |
| 2006/0019657 A1 | 1/2006 | Gallagher |
| 2006/0019658 A1 | 1/2006 | Gallagher |
| 2006/0025143 A1 | 2/2006 | Gallagher |
| 2006/0025144 A1 | 2/2006 | Gallagher |
| 2006/0025145 A1 | 2/2006 | Gallagher |
| 2006/0025146 A1 | 2/2006 | Gallagher |
| 2006/0025147 A1 | 2/2006 | Gallagher |
| 2006/0079258 A1 | 4/2006 | Gallagher |
| 2006/0079259 A1 | 4/2006 | Gallagher |
| 2006/0079273 A1 | 4/2006 | Gallagher |
| 2006/0079274 A1 | 4/2006 | Gallagher |
| 2006/0094431 A1 | 5/2006 | Saifullah et al. |
| 2006/0098598 A1 | 5/2006 | Gallagher |
| 2006/0099935 A1 | 5/2006 | Gallagher |
| 2006/0172732 A1 | 8/2006 | Nylander et al. |
| 2006/0223497 A1 | 10/2006 | Gallagher |
| 2006/0223498 A1 | 10/2006 | Gallagher |

FOREIGN PATENT DOCUMENTS

| | | | |
|---|---|---|---|
| EP | 1207708 | A1 | 5/2002 |
| EP | 1207708 | B1 | 10/2004 |
| GB | 2282735 | A | 4/1995 |
| WO | WO 9204796 | A1 | 3/1992 |
| WO | WO 9724004 | A1 | 7/1997 |
| WO | WO 9948312 | A1 | 9/1999 |
| WO | WO 9948315 | A1 | 9/1999 |
| WO | WO 0028762 | A1 | 5/2000 |
| WO | WO 0051387 | A1 | 8/2000 |
| WO | WO 0245456 | A1 | 6/2002 |
| WO | WO 03039009 | A2 | 5/2003 |
| WO | WO 03039009 | A3 | 5/2003 |
| WO | WO 03092312 | A1 | 11/2003 |
| WO | WO 2004002051 | A2 | 12/2003 |
| WO | WO 2004034219 | A2 | 4/2004 |
| WO | WO 2004039111 | A1 | 5/2004 |
| WO | WO 2005006597 | A1 | 1/2005 |
| WO | WO 2005/107169 | A1 | 11/2005 |
| WO | WO 2005107297 | A1 | 11/2005 |
| WO | WO 2005114918 | A3 | 3/2006 |
| WO | WO 2006084222 | A2 | 8/2006 |

OTHER PUBLICATIONS

Non-Final Office Action of U.S. Appl. No. 10/115,835, Jul. 25, 2005 (mailing date), Jahangir Mohammed.
Non-Final Office Action of U.S. Appl. No. 10/116,023, Apr. 13, 2006 (mailing date), Mohammed, Jahangir.
Final Office Action of U.S. Appl. No. 10/116,186, Feb. 1, 2006 (mailing date), Jahangir Mohammed.
Non-Final Office Action of U.S. Appl. No. 10/116,311, Feb. 9, 2006 (mailing date), Jahangir Mohammed.
Non-Final Office Action of U.S. Appl. No. 10/251,901, May 5, 2005 (mailing date), Michael D. Gallagher.
Non-Final Office Action of U.S. Appl. No. 10/688,470, Dec. 15, 2005 (mailing date), Michael D. Gallagher.
Non-Final Office Action of U.S. Appl. No. 11/004,439, Sep. 21, 2005 (mailing date), Michael D. Gallagher.
Non-Final Office Action of U.S. Appl. No. 11/004,439, Apr. 21, 2006 (mailing date), Gallagher, Michael.
Non-Final Office Action of U.S. Appl. No. 11/225,398, Apr, 5, 2006 (mailing date), Gallagher, Michael.
Non-Final Office Action of U.S. Appl. No. 11/225,870, May 30, 2006 (mailing date), Gallagher, Michael.
Non-Final Office Action of U.S. Appl. No. 11/225,871, Mar. 30, 2006 (mailing date), Gallagher, Michael.
Non-Final Office Action of U.S. Appl. No. 11/225,872, May 8, 2006 (mailing date), Gallagher, Michael.
Non-Final Office Action of U.S. Appl. No. 11/226,610, Mar. 29, 2006 (mailing date), Gallagher, Michael.
Non-Final Office Action of U.S. Appl. No. 11/226,617, Apr. 6, 2006 (mailing date), Gallagher, Michael.
Non-Final Office Action of U.S. Appl. No. 11/227,573, Apr. 6, 2006 (mailing date), Gallagher, Michael.
Non-Final Office Action of U.S. Appl. No. 11/227,784, Mar. 28, 2006 (mailing date), Gallagher, Michael.
Non-Final Office Action of U.S. Appl. No. 11/227,840, Apr. 21, 2006 (mailing date), Gallagher, Michael.
Non-Final Office Action of U.S. Appl. No. 11/227,842, Jun. 5, 2006 (mailing date), Gallagher, Michael.
Non-Final Office Action of U.S. Appl. No. 11/228,853, Jun. 5, 2006 (mailing date), Gallagher, Michael.
Non-Final Office Action of U.S. Appl. No. 11/229,470, Jun. 6, 2006 (mailing date), Gallagher, Michael.
Notice of Allowance of U.S. Appl. No. 11/349,024, Jun. 19, 2007 (mailing date), Gallagher, Michael.
Final Office Action of U.S. Appl. No. 11/349,024, Mar. 16, 2007 (mailing date), Gallagher, Michael.
Non-Final Office Action of U.S. Appl. No.11/349,024, Aug. 11, 2006 (mailing date), Gallagher, Michael.
Notice of Allowance of U.S. Appl. No. 11/349,025, Jun. 7, 2007 (mailing date), Gallagher, Michael.

Final Office Action of U.S. Appl. No. 11/349,025, Mar. 16, 2007 (mailing date), Gallagher, Michael.

Non-Final Office Action of U.S. Appl. No. 11/349,025, Aug. 11, 2006 (mailing date), Gallagher, Michael.

U.S. Appl. No. 11/093,703, filed Mar. 30, 2005, Gupta, Rajeev.

U.S. Appl. No. 11/110,222, filed Apr. 20, 2005, Gallagher, et al.

International Search Report for PCT/US2005/040689, Mar. 13, 2006 (mailing date), Kineto Wireless, Inc.

Written Opinion of the International Searching Authority for for PCT/US2005/040689, Mar. 13, 2006 (mailing date), Kineto Wireless, Inc.

International Search Report for PCT/US2006/004036, Jul. 31, 2006 (mailing date), Kineto Wireless, Inc.

Written Opinion of the International Searching Authority for PCT/US2006/004036, Jul. 31, 2006 (mailing date), Kineto Wireless, Inc.

*Erricson Press Release:* "Ericsson presents the Mobile@Hometm concept," Mar. 21, 2001, printed Jan. 6, 2004, pp. 1-2.

Claus Lindholt Hansen et al., "Mobile@Home- a New 1 Use Case for Bluetooth in the Access Network," *LM Ericsson Business Unit Multi-Service Networks,* ISSLS 2002, Apr. 14-18, 2002, Seoul, Korea, printed Dec. 8, 2003, 10 pages.

Perkins, Charles E., "Simplified Routing for Mobile Computers Using TCP/IP, Wireless LAN Implementation," *IBM T.J. Watson Research Ceneter,* 0-8186-2625-9/92 1992 Proceedings, IEEE Conference on Sep. 17-18, 1992, pp. 7-13.

Wu, Jon C. et al., "Intelligent Handoff for Mobile Wireless Internet," *Mobile Networks and Applications,* 6, 2001 Kluwer Academic Publishers, Manufactured in the Netherlands, Jan. 2001, pp. 67-79, printed Oct. 26, 2004.

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.

"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.

* cited by examiner

SERVICE ACCESS CONTROL INTERFACE FOR AN UNLICENSED WIRELESS COMMUNICATION SYSTEM

CLAIM OF BENEFIT TO PRIOR APPLICATIONS

This application is a continuation application of U.S. patent application Ser. No. 11/349,024, now U.S. Pat. No. 7,272,397, entitled "Service Access Control Interface for an Unlicensed Wireless Communication System," filed Feb. 06, 2006. U.S. patent application Ser. No. 11/349,024 claims the benefit of U.S. Provisional Application 60/649,977, entitled "Circuit Switched Services Interface for a Licensed Wireless Communication System Using an Unlicensed Wireless Communication System," filed Feb. 4, 2005, which is herein incorporated by reference. U.S. patent application Ser. No. 11/349,024 also claims the benefit of U.S. Provisional Application 60/722,936, entitled "Circuit Switched Services Interface for a Licensed Wireless Communication System Using an Unlicensed Wireless Communication," filed Sep. 29, 2005, which is herein incorporated by reference.

U.S. patent application Ser. No. 11/349,024 is also a continuation in part of U.S. patent application Ser. No. 10/688,470, now U.S. Pat. No. 7,127,250, entitled "Apparatus and Method for Extending the Coverage Area of a Licensed Wireless Communication System using an Unlicensed Wireless Communication system," filed Oct. 17, 2003, and U.S. patent application Ser. No. 11/129,134, entitled "Messaging in an Unlicensed Mobile Access Telecommunications System," filed May 12, 2005. The content of both applications is herein incorporated by reference.

FIELD OF THE INVENTION

The invention relates to telecommunication. More particularly, this invention relates to a technique for seamlessly integrating voice and data telecommunication services across a licensed wireless system and an unlicensed wireless system.

BACKGROUND OF THE INVENTION

In order to gain access to an unlicensed mobile access (UMA) network (UMAN), a UMA subscriber has to be authenticated. For instance, the subscriber may be required to have a UMA subscription. Also, the subscriber has to access UMA through a valid access point and the access point has to be located within a valid Public Land Mobile Access Network (PLMN).

While the UMA/3GPP specification provides a method to enable basic authentication for UMA subscribers to the service, mobile network operators typically require finer grain control over the access that their customers have to the network, providing an opportunity for the operator to differentiate the services offered over the UMA interface. A typical example might be that of restricting a subscriber to a single WLAN zone or allowing the subscriber to register from a hotspot as well. Therefore, there is a need in the art for a system to authenticate and authorize a UMA subscriber for having access to the UMAN.

Some embodiments provide a method of performing discovery transactions for the UMAN. The method sends a discovery request message from the MS to the UNC. The method also sends a set of attributes from the UNC to an authentication server. The method further authenticates the discovery request by the authentication server by utilizing information in a set of databases. The method sends the result of the authentication from the authentication server to the UNC.

Some embodiments provide a method of performing discovery transactions for the UMAN. The method sends a discovery request message from the MS to the UNC. The method also sends a set of attributes from the UNC to an authentication server. The method further authenticates the discovery request by the authentication server by utilizing information in a set of databases. The method sends the result of the authentication from the authentication server to the UNC.

SUMMARY OF THE INVENTION

Some embodiments provide a system for authorization and authentication of an unlicensed mobile access (UMA) subscriber. The system includes an UMA network controller (UNC) which is communicatively coupled to a licensed wireless communication system. The system also includes an access point (AP) that serves a wireless local area network (WLAN). In some embodiments, the UNC and the AP are connected through a broadband access network. The system further includes a mobile station (MS) that is communicatively coupled to the AP and the licensed wireless communication system. The system also includes an authentication server that is communicatively coupled to the UNC. The authentication server authenticates a UMA subscriber for accessing an unlicensed mobile access network (UMAN) that includes the UNC and the AP.

Some embodiments define an interface between the UNC and the authentication server uses Remote Access Dial-In User Service (RADIUS) protocol. In some embodiments, the authentication server is communicatively coupled to the licensed wireless communication system Home Location Register (HLR) and a set of databases that contain authorization, authentication, and accounting data. In some embodiments, the authentication server is an Authorization, Authentication, and Accounting (AAA) server.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
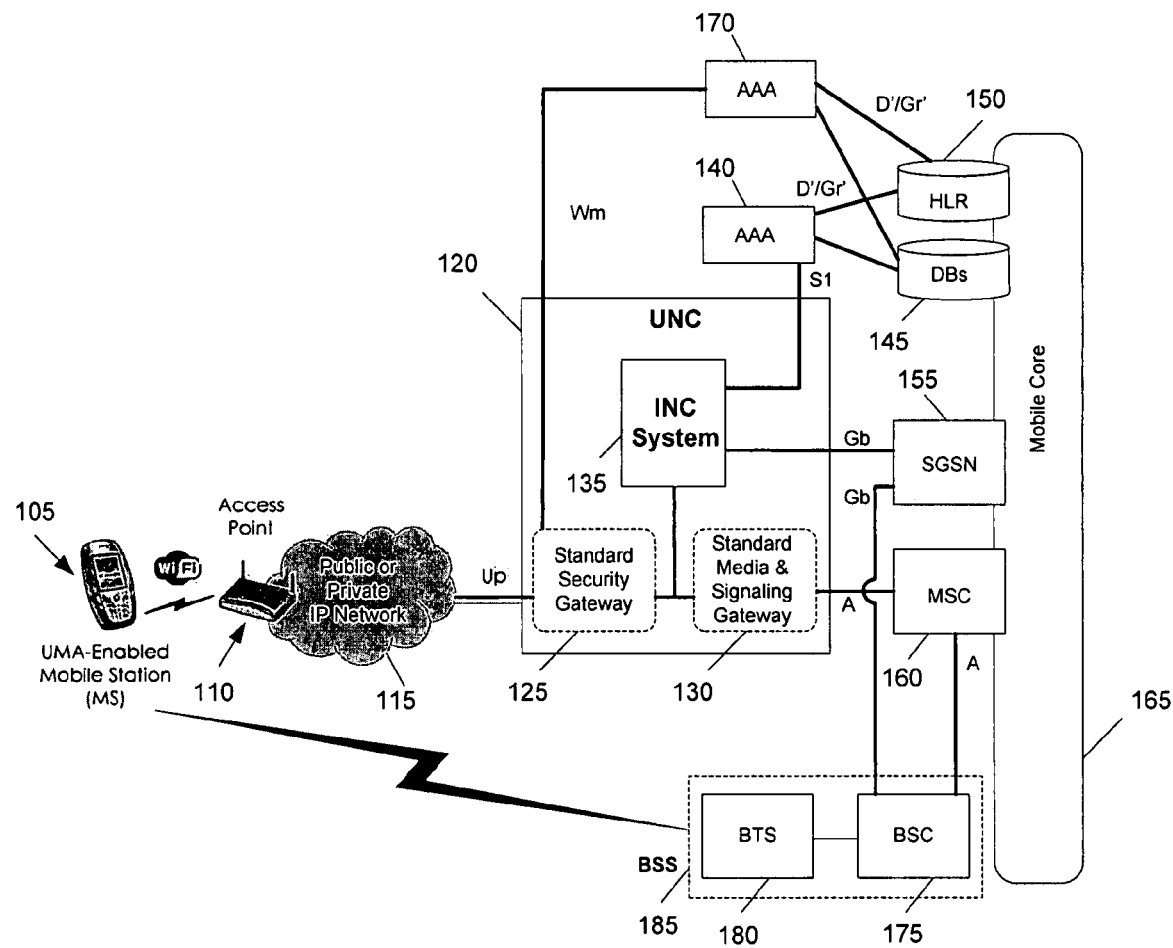
FIG. 1 illustrates the overall system architecture of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a system for authorization and authentication of an unlicensed mobile access (UMA) subscriber. The system includes an UMA network controller (UNC) which is communicatively coupled to a licensed wireless communication system. The system also includes an access point (AP) that serves a wireless local area network (WLAN). In some embodiments, the UNC and the AP are connected through a broadband access network. The system further includes a mobile station (MS) that is communicatively coupled to the AP and the licensed wireless communication system. The system also includes an authentication server that is communicatively coupled to the UNC. The authentication server authenticates a UMA subscriber for accessing an unlicensed mobile access network (UMAN) that includes the UNC and the AP.

Some embodiments define an interface between the UNC and the authentication server uses Remote Access Dial-In User Service (RADIUS) protocol. In some embodiments, the authentication server is communicatively coupled to the licensed wireless communication system Home Location Register (HLR) and a set of databases that contain authorization, authentication, and accounting data. In some embodiments, the authentication server is an Authorization, Authentication, and Accounting (AAA) server.

Several more detailed embodiments of the invention are described in sections below. Sections I to VI describe several more detailed embodiments that utilize Authorization, Authentication, and Accounting (AAA) servers to interface between the Unlicensed Mobile Access Network and Unlicensed Mobile Access database servers. Specifically, Section I describes the overall system in which some embodiments are incorporated. The discussion in Section I is followed by a discussion of the architecture and protocol structure of the interface, referred to as the S1 interface, between an Unlicensed Mobile Access Network Controller and the AAA in Section II. Next, Section III describes the use of the RADIUS protocol over the S1 interface. Section IV then describes the S1 service access control procedures. Next, Section V presents the configuration parameters that apply to the S1 interface. An alternative embodiment that also utilizes AAA servers is identified in Section VI. Specifically, this section describes the differences between this alternative embodiment and the embodiments described in the prior sections.

Next, Section VII describes another alternative embodiment that uses the Unlicensed Mobile Access Service Control Protocol for application layer signaling. Last, Section VIII defines the abbreviations used in this application.

I. Overall System

FIG. 1 illustrates the overall system architecture of some embodiments. Different components shown in the figure are described below. The Mobile Station (MS) 105, Access Point (AP) 110, intermediate private or public IP network 115, and Unlicensed Mobile Access (UMA) Network Controller (UNC) 120 together are referred to as the Unlicensed Mobile Access Network, or UMAN. The UMAN is also referred to as unlicensed wireless communication system. In some embodiments, the IP network is the Internet. In some embodiments, the UNC and the AP are connected through a broadband network circuits (e.g., DSL circuits, T1 circuits, E1 circuits, cable modem circuits, etc.).

The Home Location Register (HLR) 150, Serving General Packet Radio Service (GPRS) Switch Node (SGSN) 155, Mobile Switching Center (MSC) 160, and the Mobile Core 165 are part of a licensed wireless communication system. An example of such a system is the Global System for Mobile Communication (GSM) Access Network, or GERAN. As shown in FIG. 1, the MS also communicates to the licensed wireless communication system through the Base Transceiver Station (BTS) 180 and the Base Station Controller (BSC) 175. The BSC and the BTS are referred to the Base Station Subsystem (BSS) 185.

The Mobile Station 105 is a UMA-enabled mobile station. The MS is typically a handset device with dual mode GSM/ UMA support where the mode is provided using an IP over 802.11 wireless local area network (WLAN) air interface. The MS is referred to as the UMA client device; however, the device may be a mobile station or a fixed UMA device. Also, some embodiments may support Bluetooth for the WLAN air interface. The Access Point 110 (also referred to as Indoor Base Station or Unlicensed Base Station) is a standard, commercially available WLAN Access Point used to forward IP frames from the 802.11 (or Bluetooth) air interface into a public or private IP network 115.

In some embodiments, the UNC 120 includes several components: (1) a standard Security Gateway 125, (2) a Standard Media & Signaling Gateway 130, and (3) an IP Network Controller (INC) 135. The Security Gateway 125 and the Media and Signaling Gateway 130 are commercially available standard gateway systems. In some embodiments, the INC 135 includes one or more identical servers (for redundancy) and at least a pair of Load Balancing Routers (for providing system load balancing). In some embodiments the INC 135 includes UMA control functions and packet gateway functions. The UMA control functions provide the overall management, control, and signaling component of the UMAN architecture. The packet gateway functions provide the conversion of GPRS frames received from the MS into the format required to attach to the SGSN.

As shown in FIG. 1, the UNC communicates with other system components through several interfaces, which are (1) "Up", (2) "Wm", (3) "A", (4) "Gb", (5) "D'/Gr'", and (6) "S1". The "Up" interface is the standard interface for session management between the MS 105 and the UNC 120. The "Wm" interface is a standardized Remote Access Dial-In User Service (RADIUS) interface between the Security Gateway 125 and an Authorization, Authentication, and Accounting (AAA) Server 170 for authentication and authorization of the MS 105 into the UNC 120. The "A" interface is the standard interface between the MSC 160 and BSC and also between the MSC 160 and the UMAN. The Gb interface is the standard interface between the SGSN 155 and the BSC and also between the SGSN 155 and the UMAN. The "D'/Gr'" interface is the standard interface to the HLR 160.

Finally, the "S1" interface is the interface between the UNC 120 and the AAA server 140 that is described in detail in the embodiments disclosed below. The S1 interface provides an open, standard-based authorization and authentication interface from the INC to an AAA server. As such, the S1 interface provides a substantially greater degree of control over the services that may be offered by the operator to a UMA subscriber and leverages database systems 145 (such as the policy management and subscriber database systems) already in place in the network rather than forcing the need for a new information technology (IT) system. In some embodiments, the AAA server 140 that supports S1 interface and the AAA server 170 that supports Wm interface may be the same. In some embodiments, more than one AAA servers may be used to support the S1 interface. Similarly, in some embodiments, more than one AAA servers may be used to support the Wm interface.

In some embodiments, the INC 135 receives Up session specific data from the MS 105 as part of the UMA registration process. Specifically, the INC 135 receives the subscribers International Mobile Subscriber Identity (IMSI), the Media Access Control (MAC) address and service set identifier (SSID) of the serving WLAN access point as well as the Cell Global Information (CGI) from the GSM cell site upon which the MS 105 is already camped. The INC 135 then passes this information to the AAA server 140 through a standard RADIUS interface to allow the AAA server 140 to perform a number of service management policies against it.

For instance, the AAA server 140 can use the information provided to verify the subscriber has a UMA subscription, is trying to access UMA through a valid access point 110 and is using an access point 110 located within a valid Public Land Mobile Network (PLMN). Further, the AAA server 140 can obtain the location of the access point 110 from operator databases 145 (typically, the AAA accesses the databases 145 through a set of UMA database servers which are not shown in FIG. 1), and if no location is available, can deny UMA service from this access point. If the subscriber passes all authorization checks, the AAA server 140 passes the access point location information along with a service "access accept" message to the INC 135, which completes the UMA registration process and stores the location information for the duration of the Up session for this mobile station. In this approach, the AAA 140 is the policy decision point and the INC 135 is a policy enforcement point.

Some embodiments of the invention are implemented in a UMA compliant system. A UMA compliant system is a system that complies with most or all of the requirements set forth in the UMA standards elaborated in the following UMA and $3^{rd}$ Generation Partnership Project (3GPP) documents.

[UMA R] Unlicensed Mobile Access (UMA) User Perspective (Stage 1), Release 1.0.0.
[UMA A] Unlicensed Mobile Access (UMA) Architecture (Stage 2), Release 1.0.4, May 2005.
[UMA P] Unlicensed Mobile Access (UMA) Protocols (Stage 3), Release 1.0.4, May 2005.
3GPP Stage 2 document TS 43.318.
3GPP Stage 3 document TS 44.318.

II. Architecture

Figure 2:
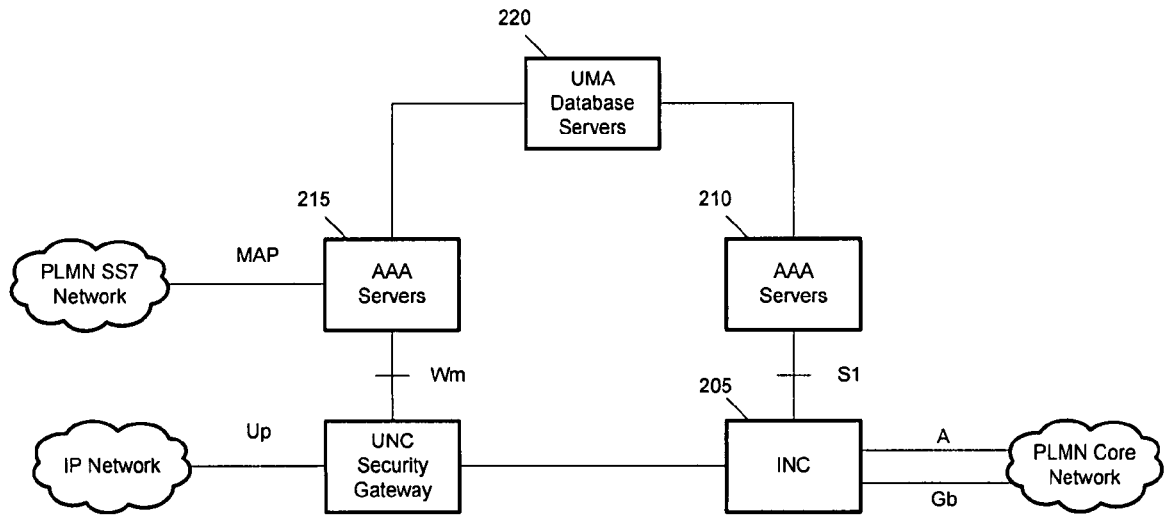
FIG. 2 illustrates the S1 interface of some embodiments.

FIG. 2 illustrates the S1 interface of some embodiments. As described above, the interface is between the INC 205 and the UMA AAA servers 210 and supports the UMA discovery and registration related procedures. As shown in this figure, in some embodiments, the INC 205 may be connected to more than one AAA server. The AAA servers 210 that support S1 interface and the AAA servers 215 that support Wm interface may or may not be the same. For instance, the service provider may deploy dedicated AAA servers for each of the two sets of functions. Also shown is the interface from the AAA servers to the various database tables (not shown) on one or more UMA database servers 220.

Figure 3:
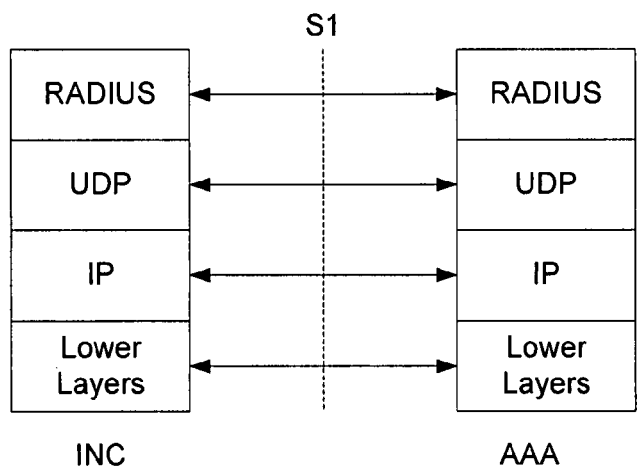
FIG. 3 illustrates the S1 protocol structure of some embodiments.

FIG. 3 illustrates the S1 protocol structure of some embodiments. The RADIUS protocol supports the application layer signaling functions between the INC and AAA. RADIUS is a protocol for carrying authentication, authorization, and configuration information between a Network Access Server which desires to authenticate its links and a shared Authentication Server.

The RADIUS protocol runs over UDP transport. The default UDP port numbers are specified in Sub-section V.A below. The S1 interface uses standard UDP procedures. One RADIUS message is encapsulated in each UDP packet.

In some embodiments, the S1 interface supports IPv4 (version 4 of the Internet Protocol). Some other embodiments may support other versions of Internet Protocol such as IPv6 (e.g., along with IPv6 support on the other UMAN interfaces). Some embodiments utilize IPSec to secure communication between the INC and AAA; e.g., via IPSec endpoint devices that are external to the INC and AAA servers.

III. Use of Radius Protocol

A. Overview

The S1 interface uses a subset of the RADIUS protocol functions. To establish the S1 interface, procedures are also added to the RADIUS protocol. Examples of such procedures include procedures that add transaction management capabilities. One such transaction management capability is RADIUS transaction timeout and retry. Another example is management of communication between an INC and multiple AAA servers (e.g., load balancing of requests to multiple AAA servers). Several examples of the use of the RADIUS protocol over the S1 interface are given below with reference to the current version of the RADIUS protocol functions that are defined in RFC 2865: "Remote Authentication Dial In User Service (RADIUS)", June 2000 (Hereinafter referred to as [RFC 2865]). A person of ordinary skill in the art will realize that as the RADIUS protocol may be modified in the future or be replaced by a similar protocol, the invention can be practiced by utilizing the newer versions of the protocol.

B. Packet Types and Attributes

Table 1 identifies the RADIUS packet types used by the S1 interface protocol of some embodiments.

TABLE 1

S1 interface RADIUS packet types

| RADIUS PACKET TYPE | REFERENCE |
|---|---|
| Access-Request | See, e.g., [RFC 2865], section 4.1 |
| Access-Accept | See, e.g., [RFC 2865], section 4.2 |
| Access-Reject | See, e.g., [RFC 2865], section 4.3 |

Each of these packet types is further described in sub-sections below. Table 2 identifies the RADIUS attributes used by the S1 interface of some embodiments.

TABLE 2

S1 interface RADIUS attributes

| RADIUS ATTRIBUTE | REFERENCE |
|---|---|
| User-Name | See, e.g., [RFC 2865], section 5.1 |
| User-Password | See, e.g., [RFC 2865], section 5.2 |
| NAS-Identifier | See, e.g., [RFC 2865], section 5.32 |
| State | See, e.g., [RFC 2865], section 5.24 |
| Termination-Action | See, e.g., [RFC 2865], section 5.29 |
| Vendor-Specific | See, e.g., [RFC 2865], section 5.26 |

Each of these attributes is further described in sub-sections below.

1. Access-Request

This RADIUS packet type may be sent by the INC to the AAA. A summary of the Access-Request packet format is shown below. The fields are transmitted from left to right.

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 | 9 | 30 | 1 |
|---|---|---|---|---|---|---|---|---|---|---|---|---|---|---|---|---|---|---|---|---|---|---|---|---|---|---|---|---|---|---|---|
| Code | | | | | | | | Identifier | | | | | | | | Length | | | | | | | | | | | | | | | |
| Request Authenticator | | | | | | | | | | | | | | | | | | | | | | | | | | | | | | | |
| Attributes . . . | | | | | | | | | | | | | | | | | | | | | | | | | | | | | | | |

The following is a description of different fields:

Code—A value of 1 in the Code field identifies the RADIUS Access-Request packet type.

Identifier—The Identifier field is changed whenever the content of the Attributes field changes, and whenever a valid reply has been received for a previous request. For retransmissions, the Identifier remains unchanged.

Length—The Length field is two octets. It indicates the length of the packet including the Code, Identifier, Length, Authenticator and Attribute fields. Octets outside the range of the Length field are treated as padding and ignored on reception. If the packet is shorter than the Length field indicates, it is silently discarded. The minimum length is 20 and maximum length is 4096.

Request Authenticator—The Request Authenticator field is defined per [RFC 2865, section 3]. The Request Authenticator value must be changed each time a new Identifier is used.

Attributes—The Attribute field is variable in length, and contains the list of Attributes that are required for the type of service, as well as any desired optional Attributes.

Table 3 lists the attributes that may be present in this packet type. Table 3 has a reference to a note. The note that is referred to in the table is the note that is listed immediately below the table. This is true about several tables that appear below. Specifically, the notes that are referred to in each particular table below are the notes that appear immediately below that particular table.

TABLE 3

Access-Request attributes

| RADIUS ATTRIBUTE | DESCRIPTION |
| --- | --- |
| User-Name | Subscriber IMSI, e.g., 112334123456789 |
| User-Password (1) | Dummy password (16 octet), e.g., 0000000000000001 |
| NAS-Identifier | INC Name (format can vary), e.g., UNC-ATL-0010 |
| State | See [RFC 2865], section 5.24. For example, the value could be 0xd0d0b463d26135944889aae29aaac388 |
| Vendor-Specific-Attributes: | |
| User-Private-IPv4-Address | Private IPv4 address received in source IP of packet from MS |
| URR-Transaction-Type | Type of URR transaction associated with access request |
| Deregister-Info | Deregistration information |
| UMA-Release-Indicator | |
| UMA-Classmark | |
| UMA-AP-Radio-Identity | |
| UMA-Geographical-Location | |
| UMA-AP-Location | |
| UMA-AP-Service-Name | |
| UMA-Register-Reject-Cause | |
| UMA-MS-Radio-Identity | UMA mobile station's WLAN MAC address or Ethernet MAC address of UMA terminal adapter or UMA fixed station |
| UMA-Coverage-Indicator | |
| UMA-Cell-Identity | |
| UMA-Location-Area-Identification | |
| UMA-Routing-Area-Code | |
| UMA-Redirection-Counter | |
| UMA-SGW-IP-Address | |
| UMA-SGW-FQDN | |
| UMA-UNC-IP-Address | |
| UMA-UNC-FQDN | |
| UMA-3G-Cell-Identity | |
| UMA-RRC-State | |
| UMA-UMA-PLMN-List | |
| UMA-Registration-Indicators | |
| UMA-Required-UMA-Services | |

Notes:
(1) In some embodiments, a password must be provided (See, e.g., [RFC 2865], section 4.1). Therefore, a User-Password attribute is included and is filled with a fixed 16-octet value.

Table 4 identifies which attributes are present in the Access-Request packet for each of the URR-Transaction-Type values. 'M' indicates a mandatory attribute, 'O' indicates an optional attribute.

TABLE 4

Attribute Presence in Access-Request Packet

| | URR-Transaction-Type | | | |
| --- | --- | --- | --- | --- |
| RADIUS Attributes | Discovery | Register-Request | Register-Update | Deregister |
| User-Name | M | M | M | M |
| User-Password | M | M | M | M |

TABLE 4-continued

Attribute Presence in Access-Request Packet

| RADIUS Attributes | URR-Transaction-Type | | | |
|---|---|---|---|---|
| | Discovery | Register-Request | Register-Update | Deregister |
| NAS-Identifier | M | M | M | M |
| State | | | M (1) | M (1) |
| Vendor-Specific-Attributes: | | | | |
| User-Private-IPv4-Address | M | M | M | M |
| URR-Transaction-Type | M | M | M | M |
| Deregister-Info | | | | M |
| UMA-Release-Indicator | M | M | | |
| UMA-Classmark | M (2) | M (2) | | |
| UMA-AP-Radio-Identity | O | O | O | |
| UMA-Geographical-Location | | O | O | |
| UMA-AP-Location | | O | O | |
| UMA-AP-Service-Name | | O | O | |
| UMA-Register-Reject-Cause | O | O | | M |
| UMA-MS-Radio-Identity | | M | | |
| UMA-Coverage-Indicator | M | M | O | |
| UMA-Cell-Identity | O | O | O | |
| UMA-Location-Area-Identification | O | O | O | |
| UMA-Routing-Area-Code | O | O | O | |
| UMA-Redirection-Counter | O | O | | |
| UMA-SGW-IP-Address | O | O | | |
| UMA-SGW-FQDN | O | O | | |
| UMA-UNC-IP-Address | O | O | | |
| UMA-UNC-FQDN | O | O | | |
| UMA-3G-Cell-Identity | O | O | O | |
| UMA-RRC-State | | O | | |
| UMA-UMA-PLMN-List | | O | | |
| UMA-Registration-Indicators | | O | | |
| UMA-Required-UMA-Services | | O | O | |

Notes:
(1) The INC sets the value of the State attribute to be the same as received in the Access-Accept packet associated with the Register-Request transaction for the MS.
(2) The UMA-Classmark attribute uses the encoding defined in UMA standard. See, e.g., [UMA P]. The INC shall convert from the UMA Release 1.0.2 format (single octet value) to the Release 1.0.4 format (two octet value), if necessary.

2. Access-Accept

This RADIUS packet type may be sent by the AAA to the INC. A summary of the Access-Accept packet format is shown below. The fields are transmitted from left to right.

| 00 1 2 3 4 5 6 7 8 9 10 1 2 3 4 5 6 7 8 9 20 1 2 3 4 5 6 7 8 9 30 1 |
|---|
| Code | Identifier | Length |
| Response Authenticator |
| Attributes . . . |

The following is a description of different fields:

Code—A value of 2 in the Code field identifies the RADIUS Access-Accept packet type.

Identifier—The Identifier field is a copy of the Identifier field of the Access-Request which resulted in this Access-Accept packet.

Length—The Length field is two octets. It indicates the length of the packet including the Code, Identifier, Length, Authenticator and Attribute fields. Octets outside the range of the Length field are treated as padding and ignored on reception. If the packet is shorter than the Length field indicates, it is silently discarded. The minimum length is 20 and maximum length is 4096.

Response Authenticator—The Response Authenticator field is defined per [RFC 2865, section 3]. The Response Authenticator value is calculated from the Access-Request value, as described earlier.

Attributes—The Attribute field is variable in length, and contains the list of Attributes that are required for the type of service, as well as any desired optional Attributes.

Table 5 identifies the attributes that may be present in this packet type:

TABLE 5

Access-Accept attributes

| RADIUS ATTRIBUTE | DESCRIPTION |
| --- | --- |
| User-Name | Subscriber IMSI, e.g., 112334123456789 |
| State | See [RFC 2865], section 5.24. For example, the value may be 0xd0d0b463d26135944889aae29aaac388 |
| Termination-Action | See [RFC 2865], section 5.29 |
| | Action INC will take when MS connection to INC is released |
| | 0 = Default (do nothing) |
| | 1 = Send new Access-Request |
| Vendor-Specific-Attributes: | |
| URR-Transaction-Type | Type of URR transaction associated with access accept |
| User-Public-IPv4-Address | |
| Max-Concurrent-Calls | |
| UMA-Location-Status | |
| UMA-Geographical-Location | |
| UMA-Service-Zone-Information | |
| UMA-Cell-Identity | |
| UMA-Location-Area-Identification | |
| UMA-SGW-IP-Address | |
| UMA-SGW-FQDN | |
| UMA-UNC-IP-Address | |
| UMA-UNC-FQDN | |
| UMA-Serving-UNC-Table-Indicator | |

Table 6 identifies which attributes are present in the Access-Accept packet for each of the URR-Transaction-Type values. 'M' indicates a mandatory attribute, 'O' indicates an optional attribute.

3. Access-Reject

This RADIUS packet type may be sent by the AAA to the INC. A summary of the Access-Reject packet format is shown below. The fields are transmitted from left to right.

TABLE 6

Attribute Presence in Access-Accept Packet

| | URR-Transaction-Type | | | |
| --- | --- | --- | --- | --- |
| RADIUS Attributes | Discovery | Register-Request | Register-Update | Deregister |
| User-Name | M | M | M | M |
| State | | M (1) | M (2) | M (2) |
| Termination-Action | | M (3) | | |
| Core Vendor-Specific-Attributes: | | | | |
| URR-Transaction-Type | M | M | M | M |
| User-Public-IPv4-Address | | O (4) | O (4) | |
| Max-Concurrent-Calls | | O (5) | O (5) | |
| UMA-Location-Status | | O | O | |
| UMA-Geographical-Location | | O | O | |
| UMA-Service-Zone-Information | | O | O | |
| UMA-Cell-Identity | | O | | |
| UMA-Location-Area-Identification | | O | | |
| UMA-SGW-IP-Address | O | | | |
| UMA-SGW-FQDN | O | | | |
| UMA-UNC-IP-Address | O | | | |
| UMA-UNC-FQDN | O | | | |
| UMA-Serving-UNC-Table-Indicator | | O | | |

Notes:
(1) State is always included in the Register-Request response from the AAA.
(2) The AAA sets the value of the State attribute to be the same as received in the Access-Request packet that caused the transaction.
(3) Note that this parameter shall always be included by the AAA.
(4) This parameter should be included by the AAA, if available.
(5) If this parameter is not included, the INC shall treat as if 'No limit' was included.

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 | 9 | 30 | 1 |
|---|---|---|---|---|---|---|---|---|---|---|---|---|---|---|---|---|---|---|---|---|---|---|---|---|---|---|---|---|---|---|---|
| Code | | | | | | | | | | | Identifier | | | | | | | | | | Length | | | | | | | | | | |
| Response Authenticator | | | | | | | | | | | | | | | | | | | | | | | | | | | | | | | |
| Attributes . . . | | | | | | | | | | | | | | | | | | | | | | | | | | | | | | | |

Code—A value of 3 in the Code field identifies the RADIUS Access-Reject packet type.

Identifier—The Identifier field is a copy of the Identifier field of the Access-Request which resulted in this Access-Reject packet.

Length—The Length field is two octets. It indicates the length of the packet including the Code, Identifier, Length, Authenticator and Attribute fields. Octets outside the range of the Length field are treated as padding and ignored on reception. If the packet is shorter than the Length field indicates, it is silently discarded. The minimum length is 20 and maximum length is 4096.

Response Authenticator—The Response Authenticator field is defined per [RFC 2865, section 3]. The Response Authenticator value is calculated from the Access-Request value, as described earlier.

Attributes—The Attribute field is variable in length, and contains the list of Attributes that are required for the type of service, as well as any desired optional Attributes.

Table 7 identifies the attributes that may be present in this packet type:

TABLE 7

Access-Reject attributes

| RADIUS ATTRIBUTE | DESCRIPTION |
|---|---|
| User-Name | Subscriber IMSI, e.g., 112334123456789 |
| State | See [RFC 2865], section 5.24. For example, the value may be 0xd0d0b463d26135944889aae29aaac388 |
| Core Vendor-Specific-Attributes: | |
| URR-Transaction-Type | Type of URR transaction associated with access reject |
| UMA-Discovery-Reject-Cause | Reason for discovery reject |
| UMA-Register-Reject-Cause | Reason for register-reject or register-update reject |
| UMA-TU3902-Timer | |
| UMA-TU3907-Timer | |
| UMA-SGW-IP-Address | |
| UMA-SGW-FQDN | |
| UMA-UNC-IP-Address | |
| UMA-UNC-FQDN | |
| UMA-Serving-UNC-Table-Indicator | |
| UMA-UMA-PLMN-List | |
| UMA-Location-Blacklist-Indicator | |
| UMA-Location-Area-Identification | |

Table 8 identifies which attributes are present in the Access-Accept packet for each of the URR-Transaction-Type values. 'M' indicates a mandatory attribute, 'O' indicates an optional attribute.

TABLE 8

Attribute Presence in Access-Reject Packet

| RADIUS Attributes | Register-Request | Register-Update | Deregister |
|---|---|---|---|
| User-Name | M | M | M |
| State | M | M | M |
| Vendor-Specific-Attributes: | | | |
| URR-Transaction-Type | M | M | M |
| UMA-Discovery-Reject-Cause | | | |
| UMA-Register-Reject-Cause | M | M | |
| UMA-TU3902-Timer | | | |
| UMA-TU3907-Timer | O | O | |
| UMA-SGW-IP-Address | O | O | |
| UMA-SGW-FQDN | O | O | |
| UMA-UNC-IP-Address | O | O | |
| UMA-UNC-FQDN | O | O | |
| UMA-Serving-UNC-Table-Indicator | O | O | |
| UMA-UMA-PLMN-List | O | O | |
| UMA-Location-Blacklist-Indicator | O | O | |
| UMA-Location-Area-Identification | O | O | |

C. Vendor-Specific-Attributes

The coding of the RADIUS vendor-specific attribute follows the guidelines defined in [RFC 2865, section 5.26]. The following diagram illustrates the format.

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 | 9 | 30 | 1 |
|---|---|---|---|---|---|---|---|---|---|---|---|---|---|---|---|---|---|---|---|---|---|---|---|---|---|---|---|---|---|---|---|
| Type | | | | | | | | | | | Length | | | | | | | | | | Vendor-Id | | | | | | | | | | |
| Vendor-Id (cont) | | | | | | | | | | | | | | | | | | | | | Vendor-Type | | | | | | | | | | |
| Vendor-Length | | | | | | | | | | | | | | | | | Attribute specific . . . | | | | | | | | | | | | | | |

Type—A value of 26 in the Type field identifies Vendor-Specific attributes

Length—The Length field specifies a value of >=10

Vendor-Id—The high-order octet is 0 and the low-order 3 octets are the SMI Network Management Private Enterprise Code of the vendor in network byte order. For instance, a specific vendor's assigned code may be 16445.

Vendor-Type—The value in the vendor-type field corresponds to the value in the UMA information element (IE) tag-field for Vendor Specific Attributes (VSAs) that are based on UMA IEs. The current UMA IEs have values coded in a single octet. In order to carry one of these IEs in a VSA, it is necessary to code the value in the two-octet vendor-type field. The type values for non-UMA VSAs are defined in Sub-section III.C.2, below.

Vendor-Length—The value in the vendor-length field equals the length of the vendor-type plus vendor-length plus attribute-specific fields in the VSA. For VSAs that are based on UMA information elements this is equal to 9 plus the value of the UMA IE length-field. If a UMA IE has length coded in two octets (e.g., length=130), it is necessary to convert the value into a single octet vendor-length encoding in a VSA. Also, the RADIUS VSA format allows no more than 255 octets in the entire VSA. Therefore, the UMA IE value can be no more than 246 octets in length. The length values for other VSAs are defined in Sub-section III.C.2, below.

Attribute specific—This corresponds to the UMA IE value-field for VSAs that are based on UMA information elements. The attribute values for other VSAs are defined in Sub-section III.C.2, below.

1. VSAs Based on UMA Information Elements

Table 9 lists the VSAs that are based on UMA parameters. Refer to the UMA reference sections for the vendor-type, vendor-length and attribute specific values.

TABLE 9

VSAs based on UMA IEs

| RADIUS ATTRIBUTE | UMA INFORMATION ELEMENT | UMA REFERENCE |
|---|---|---|
| UMA-AP-Location | AP-Location | See, e.g., [UMA P] section 11.2.42 |
| UMA-AP-Radio-Identity | AP-Radio-Identity | See, e.g., [UMA P] section 11.2.3 |
| UMA-MS-Radio-Identity | MS-Radio-Identity | See, e.g., [UMA P] section 11.2.3 (1) |
| UMA-AP-Service-Name | AP-Service-Name | See, e.g., [UMA P] section 11.2.61 |
| UMA-Classmark | UMA-Classmark | See, e.g., [UMA P] section 11.2.7 |
| UMA-Discovery-Reject-Cause | Discovery-Reject-Cause | See, e.g., [UMA P] section 11.2.12 |
| UMA-Geographical-Location | Geographical-Location | See, e.g., [UMA P] section 11.2.8 |
| UMA-Location-Status | Location-Status | See, e.g., [UMA P] section 11.2.44 |
| UMA-Release-Indicator | UMA-Release-Indicator | See, e.g., [UMA P] section 11.2.2 |
| UMA-Register-Reject-Cause | Register-Reject-Cause | See, e.g., [UMA P] section 11.2.21 |
| UMA-Service-Zone-Information | UMA-Service-Zone-Information | See, e.g., [UMA P] section 11.2.62 |
| UMA-TU3902-Timer | TU3902-Timer | See, e.g., [UMA P] section 11.2.24 |
| UMA-TU3907-Timer | TU3907-Timer | See, e.g., [UMA P] section 11.2.16 |
| UMA-SGW-IP-Address | UNC-SGW-IP-Address | See, e.g., [UMA P] section 11.2.9 |
| UMA-SGW-FQDN | UNC-SGW-FQDN | See, e.g., [UMA P] section 11.2.10 |
| UMA-UNC-IP-Address | UNC-IP-Address | See, e.g., [UMA P] section 11.2.9 (2) |
| UMA-UNC-FQDN | UNC-FQDN | See, e.g., [UMA P] section 11.2.10 (3) |
| UMA-Serving-UNC-Table-Indicator | Serving-UNC-Table-Indicator | See, e.g., [UMA P] section 11.2.67 |
| UMA-UMA-PLMN-List | UMA-PLMN-List | See, e.g., [UMA P] section 11.2.69 |
| UMA-Location-Blacklist-Indicator | Location-Blacklist-Indicator | See, e.g., [UMA P] section 11.2.58 |
| UMA-Cell-Identity | Cell-Identity | See, e.g., [UMA P] section 11.2.4 |
| UMA-Location-Area-Identification | Location-Area-Identification | See, e.g., [UMA P] section 11.2.5 |
| UMA-Coverage-Indicator | GERAN/UTRAN-Coverage-Indicator | See, e.g., [UMA P] section 11.2.6 |
| UMA-Routing-Area-Code | Routing-Area-Code | See, e.g., [UMA P] section 11.2.41 |
| UMA-Redirection-Counter | Redirection-Counter | See, e.g., [UMA P] section 11.2.11 |
| UMA-3G-Cell-Identity | 3G-Cell-Identity | See, e.g., [UMA P] section 11.2.73 |
| UMA-RRC-State | RRC-State | See, e.g., [UMA P] section 11.2.17 |
| UMA-Registration-Indicators | Registration-Indicators | See, e.g., [UMA P] section 11.2.68 |

Notes:
(1) The MS-Radio-Identity format is defined in [UMA P] section 11.2.3. However, note that the IE identifier is '96' as defined in [UMA P] section 11.2.
(2) The UNC-IP-Address format is defined in [UMA P] section 11.2.9. However, note that the IE identifier is '97' as defined in [UMA P] section 11.2.
(3) The UNC-FQDN format is defined in [UMA P] section 11.2.10. However, note that the IE identifier is '98' as defined in [UMA P] section 11.2.

2. Other Vendor Specific Attributes (VSAs)

In addition to the vendor-specific attributes that are based on UMA information elements, the following vendor-specific attributes are defined to implement the S1 interface. Although, specific values are given for each field, a person of ordinary skill in the art will realize that other values can be used without deviation from teaching of the invention.

a) User-Private-IPv4-Address

This attribute indicates the source IPv4 address that was received by the INC in the URR_C message form the UMA device that triggered the access request. This attribute may be used by the AAA server (or other system) to verify that the UMA device uses the same IMSI in the URR message as was used in the Up interface IPSec tunnel establishment; i.e., by comparing the IMSI that is assigned the private IP address by the AAA during tunnel establishment and the IMSI that is present in the S1 access request for the same private IP address.

| 00 1 2 3 4 5 6 7 8 9 10 1 2 3 4 5 6 7 8 9 20 1 2 3 4 5 6 7 8 9 30 1 |
|---|
| Type | Length | Vendor-Id |
| Vendor-Id (cont) | Vendor-Type |
| Vendor-Length | Address |
| Address (cont) |

Type—Type field is set to 26

Length—Length field is set to 13

Vendor-Id—A value that identifies the vendor. For instance, a specific vendor's Id may be 16445 (0x0000403d)

Vendor-Type—A value that identifies the Type, e.g., a value of 65280 (0xff00) may be used for User-Private-IPv4-Address Vendor-Length—Vendor Length is 7

Address—The address field is four octets, with coding as defined in [RFC 2865, section 5]; i.e., a 32-bit value with the most significant octet first.

b) URR-Transaction-Type

This attribute indicates the type of URR transaction associated with the S1 transaction. Note that there is always an S1 response message from the AAA, even for the S1 transactions associated with the URR Deregister and Register-Update transactions which are unidirectional in UMA (i.e., no response message defined in UMA).

| 00 1 2 3 4 5 6 7 8 9 10 1 2 3 4 5 6 7 8 9 20 1 2 3 4 5 6 7 8 9 30 1 |
|---|
| Type | Length | Vendor-Id |
| Vendor-Id (cont) | Vendor-Type |
| Vendor-Length | URR Transaction Type |

Type—The Type field is set to 26
Length—The Length field is set to 1010
Vendor-Id—A value that identifies the vendor. For instance, a specific vendor's Id may be 16445 (0x0000403d)
Vendor-Type—A value that identifies the Type, e.g., a value of 65281 (0xff01) may be used for URR-Transaction-Type
Vendor-Length—The Vendor-Length is set to 4
URR Transaction Type—Value that identifies the URR transaction type. For example:

0=Discovery
1=Register-Request
2=Register-Update
3=Deregister c) Deregister-Info This attribute provides additional information regarding the reason the INC is sending the Deregister notification to the AAA server; i.e., in addition to the information in the UMA-Register-Reject-Cause.

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 9 | 30 | 1 |
|---|---|---|---|---|---|---|---|---|---|---|---|---|---|---|---|---|---|---|---|---|---|---|---|---|---|---|---|---|---|---|
| Type | | | | | | | | | | Length | | | | | | | | | | Vendor-Id | | | | | | | | | | |
| Vendor-Id (cont) | | | | | | | | | | | | | | | | | | | | Vendor-Type | | | | | | | | | | |
| Vendor-Length | | | | | | | | | | Deregister Info | | | | | | | | | | | | | | | | | | | | |

Type—The Type field is set to 26
Length—The length is 10
Vendor-Id—A value that identifies the vendor. For instance, a specific vendor's Id may be 16445 (0x0000403d)
Vendor-Type—A value that identifies the Type, e.g., a value of 65282 (0xff02) may be used for Deregister-Info
Vendor-Length—The vendor-Length is 4
Deregister Reason—A value to identify the reason for deregister. For example:
0=Deregister received from MS
1=Deregister sent to MS
d) User-Public-IPv4-Address
This attribute indicates the source IPv4 public address that was received by the AAA from the UNC Security Gateway during the establishment of the Up interface IPSec tunnel.

Vendor-Length—The Vendor-Length is 7

Address—The address field is four octets, with coding as defined in [RFC 2865, section 5]; i.e., a 32-bit value with the most significant octet first.

e) Max-Concurrent-Calls

This attribute indicates the maximum number of concurrent calls per access point and per broadband line IP address that shall be allowed by the INC. Note that the broadband line IP address is received in the User-Public-IPv4-Address attribute.

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 9 | 30 | 1 |
|---|---|---|---|---|---|---|---|---|---|---|---|---|---|---|---|---|---|---|---|---|---|---|---|---|---|---|---|---|---|---|
| Type | | | | | | | | | | Length | | | | | | | | | | Vendor-Id | | | | | | | | | | |
| Vendor-Id (cont) | | | | | | | | | | | | | | | | | | | | Vendor-Type | | | | | | | | | | |
| Vendor-Length | | | | | | | | | | Address | | | | | | | | | | | | | | | | | | | | |
| Address (cont) | | | | | | | | | | | | | | | | | | | | | | | | | | | | | | |

Type—The Type field is set to 26
Length—The Length is 13

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 | 9 | 30 | 1 |
|---|---|---|---|---|---|---|---|---|---|---|---|---|---|---|---|---|---|---|---|---|---|---|---|---|---|---|---|---|---|---|---|
| Type | | | | | | | | | | Length | | | | | | | | | | Vendor-Id | | | | | | | | | | | |
| Vendor-Id (cont) | | | | | | | | | | | | | | | | | | | | Vendor-Type | | | | | | | | | | | |
| Vendor-Length | | | | | | | | | | Max-Calls-Per-AP | | | | | | | | | | Max-Calls-Per-IP-Address | | | | | | | | | | | |

Vendor-Id—A value that identifies the vendor. For instance, a specific vendor's Id may be 16445 (0x0000403d)
Vendor-Type—A value that identifies the Type, e.g., a value of 65283 (0xff03) may be used for User-Public-IPv4-Address Type—The Type field is set to 26
Length—The Length is 10
Vendor-Id—A value that identifies the vendor. For instance, a specific vendor's Id may be 16445 (0x0000403d)

Vendor-Type—A value that identifies the Type, e.g., a value of 65284 (0xff04) may be used for Max-Concurrent-Calls Vendor-Length—The Vendor Length is 5

Max-Calls-Per-AP
　0=No limit
　1-255=Limit on number of concurrent calls per AP

Max-Calls-Per-IP-Address—A value to identify the maximum calls per IP address. For example:
　0=No limit
　1-255=Limit on number of concurrent calls per broadband line IP address D. Procedures 1. Deriving the AAA Address The INC is configured with the IP addresses for the set of AAA servers. In some embodiments, the DNS is not used to resolve the AAA address. In some other embodiments, the DNS may also be used to resolve the AAA address.

2. RADIUS Transaction Procedures a) Initialization

Initially, all AAA servers are marked as 'available' in the INC.

b) New Transaction

When an INC client has an S1 message to send for a new transaction that is triggered by the receipt of a URR message, it does the following:

1. If no AAA servers are available, then the INC responds to the URR request as follows:
　a. If URR-Discovery-Request was received, then send URR-Discovery-Reject with Reject Cause='Network Congestion'. The value of the timer TU3902 returned to the MS shall be chosen to achieve an acceptable delay before the MS next attempts discovery with the INC (It may make sense to have two different TU3902 timer values that can be configured in the INC; one for "normal" congestion and another to handle this case.)
　b. If URR-Register-Request was received, then send URR-Register-Reject with Reject Cause='Network Congestion'. The value of the timer TU3907 returned to the MS shall be chosen to achieve an acceptable delay before the MS next attempts to register with the INC.
　c. If URR-Register-Update-Uplink was received, then send URR-Deregister with Reject Cause='Network Congestion'. The value of the timer TU3907 returned to the MS shall be chosen to achieve an acceptable delay before the MS next attempts to register with the INC.
　d. If the S1 message is intended to signal to the AAA that the MS has been deregistered, then the INC shall abort the S1 transaction and take no further action.

2. If one or more AAA servers is available, then the INC starts transaction timer Ts1.

3. The INC selects a AAA server based on its load balancing algorithm and taking into account "unavailable" servers.

4. The INC sends the RADIUS Access-Request message to the selected AAA server and starts request timer Ts2. Possible outcomes are:
　a. If the INC receives a valid response message, then the transaction is complete and the INC processes the response per Section IV.
　b. If timer Ts2 expires, the INC retries the request one time. Note that the message contains the same ID and Request Authenticator. Possible outcomes are:
　　i. If the INC receives a valid response message, then the transaction is complete and the INC processes the response per Section IV.
　　ii. If Ts2 expires:
　　　1. The INC marks the AAA server as 'unavailable'.
　　　2. The INC raises an alarm.

5. If no AAA servers are available or timer Ts1 has expired, then the INC responds to the URR request as described in step 1.
　a. Otherwise, the procedure continues at step 3.

The AAA server processes the received message and responds as described in Section IV below.

c) AAA Server Load Balancing

Several AAA server load balancing procedures (e.g., round robin) are used by the INC.

d) AAA Server Availability Management

These procedures are used to move AAA servers from the 'unavailable' state to the 'available' state. For instance, the INC may periodically check the status of the AAA servers that were marked as 'unavailable' and if a server responds, the INC will mark it as 'available'.

IV. S1 Service Access Control Procedures

This section describes the basic service access control procedures that are defined for the INC and AAA server. The detailed descriptions of the AAA processing (e.g., the description of configuration parameters) are provided as examples of possible AAA procedures. Additional AAA-controlled procedures may be supported, as long as they do not conflict with the procedures described below.

A. Discovery Transaction

1. Discovery Transaction Initiation by the INC

This procedure is triggered when the INC receives a URR DISCOVERY REQUEST message and the S1 interface is enabled. The INC sends the set of attributes specified in Sub-section III.B.1 to the AAA in the RADIUS Access-Request message using the procedures described in Sub-section III.D. The URR-Transaction-Type attribute is set to 'Discovery'. Attributes that are optional are included if received in the URR DISCOVERY REQUEST message.

2. Discovery Transaction Processing by the AAA

The AAA performs one or more of the following procedures when it receives the Access-Request message from the INC with the URR-Transaction-Type attribute set to 'Discovery' (i.e., starting from the first procedure, then branching as necessary):

1. Discovery: Check if IMSI is authorized

2. Discovery: Check if AP is authorized

3. Send Discovery Accept

4. Send Discovery Reject (a) Discovery: Check if IMSI is Authorized

If the 'Check IMSI on Discovery' configuration parameter has value 'No', then the AAA continues with the next procedure.

If the 'Check IMSI on Discovery' configuration parameter has value 'Yes', then the AAA retrieves the subscriber record from the UMA Database Server.
　If a subscriber record is found and 'Subscriber Status=Allowed' in the subscriber record then the AAA continues with the next procedure.
　If no subscriber record is found or 'Subscriber Status=Barred' in the subscriber record then the AAA sets the UMA-Discovery-Reject-Cause to 'IMSI Not Allowed' and continues with the Send Discovery Reject procedure.
　If no response is received from the database server or other such error occurs, then the AAA sets the UMA-Discovery-Reject-Cause to 'Network Congestion' and assigns an appropriate value to the UMA-TU3902-Timer (i.e., to cause the MS to delay sending another discovery request) and continues with the Send Discovery Reject procedure.

(b) Discovery: Check if AP is Authorized

If the 'Check AP on Discovery' configuration parameter has value 'No', then the AAA continues with the next procedure.

If the 'Check AP on Discovery' configuration parameter has value 'Yes', but the UMA-Classmark attribute indicates that the UMA device is not an MS (i.e., 'no radio' in the TURA field), then the AAA continues with the next procedure.

Otherwise, the AAA retrieves the subscriber record from the UMA Database Server (if not yet retrieved).

- If no subscriber record is found or 'Subscriber Status=Barred' in the subscriber record then the AAA sets the UMA-Discovery-Reject-Cause to 'IMSI Not Allowed' and continues with the Send Discovery Reject procedure.
- If a subscriber record is found and the AP-ID is listed as a valid AP then the AAA continues with the Send Discovery Accept procedure.
- If a subscriber record is found and the AP-ID is not listed as a valid AP then the AAA sets the UMA-Discovery-Reject-Cause to 'Unspecified' and continues with the Send Discovery Reject procedure.
- If no response is received from the database server or other such error occurs, then the AAA sets the UMA-Discovery-Reject-Cause to 'Network Congestion' and assigns an appropriate value to the UMA-TU3902-Timer (i.e., to cause the MS to delay sending another discovery request) and continues with the Send Discovery Reject procedure.

(c) Send Discovery Accept Procedure

The AAA sends the RADIUS Access-Accept message to the requesting INC using the procedures described in Sub-section III.D. The URR-Transaction-Type attribute is set to 'Discovery'. The AAA then considers the transaction complete.

(d) Send Discovery Reject Procedure

The AAA sends the RADIUS Access-Reject message to the requesting INC using the procedures described in Sub-section III.D. The URR-Transaction-Type attribute is set to 'Discovery'. The AAA then considers the transaction complete.

3. Discovery Response Processing by the INC a) INC Receives Discovery Accept from AAA When the INC receives the RADIUS Access-Accept (Discovery) message from the AAA, it considers the S1 transaction complete and continues with its processing of the URR DISCOVERY REQUEST.

b) INC Receives Discovery Reject from AAA

When the INC receives the RADIUS Access-Reject (Discovery) message from the AAA, it considers the S1 transaction complete, and relays the information to the MS in the URR DISCOVERY REJECT message. If no UMA-TU3902-Timer attribute is received from the AAA and the reject cause is 'Network Congestion', the INC assigns an appropriate value and includes it in the TU3902 IE.

B. Register-Request Transaction

1. Register-Request Transaction Initiation by the INC

This procedure is triggered when the INC receives a URR REGISTER REQUEST message and the S1 interface is enabled.

The INC sends the set of attributes specified in Sub-section III.B.1 to the AAA in the RADIUS Access-Request message using the procedures described in Sub-section III.D. The URR-Transaction-Type attribute is set to 'Register-Request'. Attributes that are optional are included if received in the URR REGISTER REQUEST message.

2. Register-Request Transaction Processing by the AAA

The AAA performs one or more of the following procedures when it receives the Access-Request message from the INC with the URR-Transaction-Type attribute set to 'Register-Request' (i.e., starting from the first procedure, then branching as necessary):

1. Register-Request: Check if IMSI is authorized

2. Register-Request: Check if AP is authorized

3. Register-Request: Set Termination-Action

4. Send Register Accept

5. Send Register Reject a) Register-Request: Check if IMSI is Authorized

If the 'Check IMSI on Register-Request' configuration parameter has value 'No', then the AAA continues with the next procedure.

If the 'Check IMSI on Register-Request' configuration parameter has value 'Yes', then the AAA retrieves the subscriber record from the UMA Database Server.

- If a subscriber record is found and 'Subscriber Status=Allowed' in the subscriber record then the AAA continues with the next procedure.
- If no subscriber record is found or 'Subscriber Status=Barred' in the subscriber record then the AAA sets the UMA-Register-Reject-Cause to 'IMSI Not Allowed' and continues with the Send Register Reject procedure.
- If no response is received from the database server or other such error occurs, then the AAA sets the UMA-Register-Reject-Cause to 'Network Congestion' and assigns an appropriate value to the UMA-TU3907-Timer (i.e., to cause the MS to delay sending another register request) and continues with the Send Register Reject procedure.

b) Register-Request: Check if AP is Authorized

If the 'Check AP on Register-Request' configuration parameter has value 'No', then the AAA continues with the next procedure.

Otherwise, the AAA retrieves the subscriber record from the UMA Database Server (if not yet retrieved).

- If no subscriber record is found or 'Subscriber Status=Barred' in the subscriber record then the AAA sets the UMA-Register-Reject-Cause to 'IMSI Not Allowed' and continues with the Send Register Reject procedure.
- If a subscriber record is found and the AP is valid then the AAA continues with the next procedure. Note that there are two "valid AP" possibilities:
    1. The UMA device is an MS. In this case, the Register-Request includes both UMA-MS-Radio-Identity and UMA-AP-Radio-Identity attributes. The AAA verifies that the UMA-AP-Radio-Identity corresponds to a valid location in the subscriber record.
    2. The UMA device is not an MS (i.e., signified by the absence of the UMA-AP-Radio-Identity attribute and 'no radio' in the TURA field of the UMA-Classmark attribute); the UMA device may be a fixed terminal adapter, for example. The AAA verifies that the UMA-MS-Radio-Identity (which is the Ethernet MAC address of the fixed TA, for example) corresponds to a valid location in the subscriber record.

If a subscriber record is found and the AP is not valid then the AAA sets the UMA-Register-Reject-Cause to 'AP not allowed' and continues with the Send Register Reject procedure.

If no response is received from the database server or other such error occurs, then the AAA sets the UMA-Register-Reject-Cause to 'Network Congestion' and assigns an appropriate value to the UMA-TU3907-Timer (i.e., to cause the MS to delay sending another register request) and continues with the Send Register Reject procedure.

c) Register-Request: Set Termination-Action

If the 'Request Deregistration Notification' configuration parameter has value 'No', then the AAA sets the Termination-Action attribute to the value '0' (default) and continues with the Send Register Accept procedure.

If the 'Request Deregistration Notification' configuration parameter has value 'Yes', then the AAA sets the Termination-Action attribute to the value '1' (send new Access-Request). In this case, the AAA server may also record the subscriber's current location in a subscriber location register or other table, allowing the service provider to maintain a view of how many subscribers are operating in UMA mode, on which serving UNC, and at what AP location. The AAA then continues with the Send Register Accept procedure.

d) Send Register Accept Procedure

The AAA sends the RADIUS Access-Accept message to the requesting INC using the procedures described in Sub-section III.D. The URR-Transaction-Type attribute is set to 'Register-Request'. The AAA then considers the transaction complete.

e) Send Register Reject Procedure

The AAA sends the RADIUS Access-Reject message to the requesting INC using the procedures described in Sub-section III.D. The URR-Transaction-Type attribute is set to 'Register-Request'. The AAA then considers the transaction complete.

3. Register-Request Response Processing by the INC a) INC Receives Register Accept from AAA When the INC receives the RADIUS Access-Accept (Register-Request) message from the AAA, it considers the S1 transaction complete and continues with its processing of the URR REGISTER REQUEST, including:

If the UMA-Geographical-Location attribute is included, then the INC shall store it as the MS's current location.

If the UMA-Location-Status attribute is included, then the INC shall store the current location status and send it to the MS; otherwise, location status is not sent to the MS.

If the Termination-Action attribute is set to the value '1' then the INC marks the subscriber record to indicate that AAA notification is required on deregistration.

b) INC Receives Register Reject from AAA

When the INC receives the RADIUS Access-Reject (Register-Request) message from the AAA, it considers the S1 transaction complete, and relays the information to the MS in the URR REGISTER REJECT message.

C. Register-Update Transaction

1. Register-Update Transaction Initiation by the INC

This procedure is triggered when the INC receives a URR REGISTER UPDATE UPLINK message and the S1 interface is enabled.

The INC sends the set of attributes specified in Sub-section III.B.1 to the AAA in the RADIUS Access-Request message using the procedures described in Sub-section III.D. The URR-Transaction-Type attribute is set to 'Register-Update'. Attributes that are optional are included if received in the URR REGISTER UPDATE UPLINK message.

2. Register-Update Transaction Processing by the AAA

The AAA performs one or more of the following procedures when it receives the Access-Request message from the INC with the URR-Transaction-Type attribute set to 'Register-Update' (i.e., starting from the first procedure, then branching as necessary):

1. Register-Update: Check if AP is authorized

2. Send Register Update Accept

3. Send Register Update Reject a) Register-Update: Check if AP is Authorized

If the 'Check AP on Register-Update' configuration parameter has value 'No', then the AAA continues with the Send Register Update Accept procedure.

If the 'Check AP on Register-Update' configuration parameter has value 'Yes', then the AAA retrieves the subscriber record from the UMA Database Server.

If no subscriber record is found or 'Subscriber Status=Barred' in the subscriber record then the AAA sets the UMA-Register-Reject-Cause to 'IMSI Not Allowed' and continues with the Send Register Update Reject procedure.

If a subscriber record is found and the AP-ID is listed as a valid AP then the AAA continues with the Send Register Update Accept procedure. In this case, the AAA server may also update the record of the subscriber's current location in a subscriber location register or other table, allowing the service provider to maintain a view of how many subscribers are operating in UMA mode, on which serving UNC, and at what AP location.

If a subscriber record is found and the AP-ID is not listed as a valid AP then the AAA sets the UMA-Register-Reject-Cause to 'AP not allowed' and continues with the Send Register Update Reject procedure.

If no response is received from the database server or other such error occurs, then the AAA sets the UMA-Register-Reject-Cause to 'Network Congestion' and assigns an appropriate value to the UMA-TU3907-Timer (i.e., to cause the INC to delay sending another register update) and continues with the Send Register Update Reject procedure.

b) Send Register Update Accept Procedure

The AAA sends the RADIUS Access-Accept message to the requesting INC using the procedures described in Sub-section III.D. The URR-Transaction-Type attribute is set to 'Register-Update'. The AAA then considers the transaction complete.

c) Send Register Update Reject Procedure

The AAA sends the RADIUS Access-Reject message to the requesting INC using the procedures described in Sub-section III.D. The URR-Transaction-Type attribute is set to 'Register-Update'. The AAA then considers the transaction complete.

3. Register-Update Response Processing by the INC a) INC Receives Register Update Accept from AAA When the INC receives the RADIUS Access-Accept (Register-Update) message from the AAA, it considers the S1 transaction complete.

If the UMA-Geographical-Location attribute is included, then the INC shall store it as the MS's current location.

If the UMA-Location-Status attribute is included and is different from the stored location status, then the INC shall send the updated status to the MS in a URR REGISTER UPDATE DOWNLINK message; otherwise, location status is not sent to the MS.

b) INC Receives Register Update Reject from AAA

When the INC receives the RADIUS Access-Reject (Register-Update) message from the AAA, it considers the S1 transaction complete. The INC then initiates the URR Deregistration procedure using the cause provided by the AAA server (which may result in an S1 Deregistration transaction, depending on the setting of the Termination-Action attribute for the subscriber).

D. Deregister Transaction

1. Deregister Transaction Initiation by the INC

This procedure is triggered when the INC deregisters an MS which has been marked with a Termination-Action attribute set to the value '1' (send new Access-Request). The deregistration may be INC-initiated or MS-initiated.

The INC sends the set of attributes specified in Sub-section III.B.1 to the AAA in the RADIUS Access-Request message using the procedures described in Sub-section III.D. The URR-Transaction-Type attribute is set to 'Deregister'.

2. Deregister Transaction Processing by the AAA

The AAA performs one or more of the following procedures when it receives the Access-Request message from the INC with the URR-Transaction-Type attribute set to 'Deregister' (i.e., starting from the first procedure, then branching as necessary):

1. Deregister: Update subscriber location register

2. Send Deregister Accept

3. Send Deregister Reject a) Deregister: Update Subscriber Location Register

The AAA server may update the record of the subscriber's current location in a subscriber location register or other table, allowing the service provider to maintain a view of how many subscribers are operating in UMA mode, on which serving UNC, and at what AP location.

b) Send Deregister Accept Procedure

The AAA sends the RADIUS Access-Accept message to the requesting INC using the procedures described in Sub-section III.D. The URR-Transaction-Type attribute is set to 'Deregister'. The AAA then considers the transaction complete.

c) Send Deregister Reject Procedure

The Send Deregister Reject procedure is not allowed.

3. Deregister Response Processing by the INC

INC Receives Deregister Accept from AAA

When the INC receives the RADIUS Access-Accept (Deregister) message from the AAA, it considers the S1 transaction complete.

V. Configuration Parameters

A. INC Parameters

The Table 10 summarizes the configuration parameters that apply to the S1 interface at the INC.

TABLE 10

Configuration Parameters Applying to the S1 Interface at the INC

| Name | Format | Values | Default | Description |
|---|---|---|---|---|
| RADIUS Server Port Number | Decimal | Any valid UDP port value that is coordinated with the RADIUS server | 1812 | See Section II |
| One or more AAA Address | Binary | Any valid IPv4 address | None | See Sub-section III.D.1 |
| Ts1 Timer | Binary | 1-25 seconds | 20 sec. | S1 transaction timer, which may span one or more request retries if no response is received from AAA. See Sub-section III.D.2 |
| Ts2 Timer | Binary | 1-10 seconds | 5 sec. | S1 access request timer. See Sub-section III.D.2 |

B. AAA Parameters

The Table 11 summarizes the configuration parameters that apply to the S1 interface and associated processing at the AAA.

TABLE 11

Configuration Parameters that Apply to the S1 Interface and Associated Processing at the AAA

| Name | Format | Values | Default | Description |
|---|---|---|---|---|
| Check IMSI on Discovery | Boolean | Yes or No | No | See Sub-section IV.A.2.a |
| Check AP on Discovery | Boolean | Yes or No | Yes | See Sub-section IV.A.2.b |
| Check IMSI on Register Request | Boolean | Yes or No | No | See Sub-section IV.A.2.a |
| Check AP on Register Request | Boolean | Yes or No | Yes | See Sub-section IV.B.2.b |
| Request Deregistration Notification | Boolean | Yes or No | No | See Sub-section IV.B.2.c |
| Check AP on Register-Update | Boolean | Yes or No | Yes | See Sub-section IV.C.2.a |
| TU3902 Timer | Binary | | | See [UMA P, section 11.2.24] |
| TU3907 Timer | Binary | | | See [UMA P, section 11.2.16] |

VI. Alternative Embodiment

Some embodiments use modified versions of the protocols described above for the S1 interface between the INC and the AAA server. These embodiments are described in this section. A person of ordinary skill in the art will realize that the same technique described in this section can be utilized to add, modify, or delete features of the protocol described in Sections I-V above. The exemplary embodiment described in this section is similar to the embodiments described in Sections I-V above, except that this embodiment does not utilize RADIUS State and Termination-Action attributes. Also, this embodiment does not use the vendor specific attributes "Deregister-Info" and "User-Public-IPv4-Address". The following sub-sections highlight these differences. For simplicity, features that are similar to features described in Sections I-V are not repeated in these sub-sections. Several additional features are also described.

A. Use of RADIUS Protocol

1. S1 Interface RADIUS Attributes

Table 12 identifies the attributes used by this embodiment. This table is similar to Table 2 above, except that State and Termination-Action attributes are not used.

TABLE 12

S1 interface RADIUS attributes

| RADIUS ATTRIBUTE | REFERENCE |
| --- | --- |
| User-Name | [RFC 2865], section 5.1 |
| User-Password | [RFC 2865], section 5.2 |
| NAS-Identifier | [RFC 2865], section 5.32 |
| Vendor-Specific | [RFC 2865], section 5.26 |

2. Access-Request Attributes

Table 13 identifies the Access-Request attributes of this embodiment. These attributes are similar to Table 3 attributes, except that RADIUS attribute "State" and VSA attribute "Deregister-Info" are not used.

TABLE 13

Access-Request attributes

| RADIUS ATTRIBUTE | DESCRIPTION |
| --- | --- |
| User-Name | Subscriber IMSI, e.g., 112334123456789 |
| User-Password (1) | Dummy password (16 octet), e.g., 0000000000000001 |
| NAS-Identifier | INC Name (format can vary), e.g., UNC-ATL-0010 |
| Vendor-Specific-Attributes: | |
| User-Private-IPv4-Address | Private IPv4 address received in source IP of packet from MS |
| URR-Transaction-Type | Type of URR transaction associated with access request |
| UMA-Release-Indicator | |
| UMA-Classmark | |
| UMA-AP-Radio-Identity | |
| UMA-Geographical-Location | |
| UMA-AP-Location | |
| UMA-AP-Service-Name | |
| UMA-Register-Reject-Cause | |
| UMA-MS-Radio-Identity | UMA mobile station's WLAN MAC address or Ethernet MAC address of UMA terminal adapter or UMA fixed station |
| UMA-Coverage-Indicator | |
| UMA-Cell-Identity | |
| UMA-Location-Area-Identification | |
| UMA-Routing-Area-Code | |
| UMA-Redirection-Counter | |
| UMA-SGW-IP-Address | |
| UMA-SGW-FQDN | |
| UMA-UNC-IP-Address | |
| UMA-UNC-FQDN | |
| UMA-3G-Cell-Identity | |
| UMA-RRC-State | |
| UMA-UMA-PLMN-List | |
| UMA-Registration-Indicators | |
| UMA-Required-UMA-Services | |

Notes:
(1) A password must be provided, per [RFC 2865], section 4.1. Therefore, a User-Password attribute is included and is filled with a fixed 16-octet value.

3. Attribute Presence in Access-Request Packet

Table 14 identifies the attribute presence in Access-Request packet. This Table is similar to Table 4 above, except that RADIUS attribute "State" and VSA attribute "Deregister-Info" are not used. Also, the table does not have a Deregister column.

TABLE 14

Attribute Presence in Access-Request Packet

| | URR-Transaction-Type | | |
| --- | --- | --- | --- |
| RADIUS Attributes | Discovery | Register-Request | Register-Update |
| User-Name | M | M | M |
| User-Password | M | M | M |
| NAS-Identifier | M | M | M |
| Vendor-Specific-Attributes: | | | |
| User-Private-IPv4-Address | M | M | M |
| URR-Transaction-Type | M | M | M |
| UMA-Release-Indicator | M | M | |
| UMA-Classmark | M (1) | M (1) | |
| UMA-AP-Radio-Identity | O | O | O |
| UMA-Geographical-Location | | O | O |
| UMA-AP-Location | | O | O |
| UMA-AP-Service-Name | | O | O |
| UMA-Register-Reject-Cause | O | O | |
| UMA-MS-Radio-Identity | | M | |
| UMA-Coverage-Indicator | M | M | O |
| UMA-Cell-Identity | O | O | O |
| UMA-Location-Area-Identification | O | O | O |
| UMA-Routing-Area-Code | O | O | O |
| UMA-Redirection-Counter | O | O | |
| UMA-SGW-IP-Address | O | O | |
| UMA-SGW-FQDN | O | O | |
| UMA-UNC-IP-Address | O | O | |
| UMA-UNC-FQDN | O | O | |
| UMA-3G-Cell-Identity | O | O | O |
| UMA-RRC-State | | O | |
| UMA-UMA-PLMN-List | | O | |
| UMA-Registration-Indicators | | O | |
| UMA-Required-UMA-Services | | O | O |

Notes:
(1). The UMA-Classmark attribute uses the encoding defined in [UMA P]. The INC shall convert from the UMA Release 1.0.2 format (single octet value) to the Release 1.0.4 format (two octet value), if necessary.

4. Access-Accept Attributes

Table 15 identifies Access-Accept attributes of this embodiment. This table is similar to Table 5 above, except that RADIUS attribute "State" and VSA attribute "User-Public-IPV4-Address" are not used.

TABLE 15

Access-Accept Attributes

| RADIUS ATTRIBUTE | DESCRIPTION |
| --- | --- |
| User-Name | Subscriber IMSI, e.g., 112334123456789 |
| Vendor-Specific-Attributes: | |
| URR-Transaction-Type | Type of URR transaction associated with access accept |
| Location-Key | |
| Max-Concurrent-Calls | |
| UMA-Location-Status | |
| UMA-Geographical-Location | |
| UMA-Service-Zone-Information | |
| UMA-Cell-Identity | |
| UMA-Location-Area-Identification | |
| UMA-SGW-IP-Address | |

TABLE 15-continued

Access-Accept Attributes

| RADIUS ATTRIBUTE | DESCRIPTION |
|---|---|
| UMA-SGW-FQDN | |
| UMA-UNC-IP-Address | |
| UMA-UNC-FQDN | |
| UMA-Serving-UNC-Table-Indicator | |

5. Attribute Presence in Access-Accept Packet

Table 16 identifies attribute presence in Access-Accept packet for this embodiment. This table is similar to Table 6 above, except that RADIUS attributes "State" and "Termination-Action" are not present. Also, the VSA attribute "User-Public-IPV4-Address" is not used. Also, the table does not have a Deregister column.

TABLE 16

Attribute Presence in Access-Accept Packet

| | URR-Transaction-Type | | |
|---|---|---|---|
| RADIUS Attributes | Discovery | Register-Request | Register-Update |
| User-Name | M | M | M |
| Core Vendor-Specific-Attributes: | | | |
| URR-Transaction-Type | M | M | M |
| Location-Key | | O | O |
| Max-Concurrent-Calls | | O (1) | O (1) |
| UMA-Location-Status | | O | O |
| UMA-Geographical-Location | | O | O |
| UMA-Service-Zone-Information | | O | O |
| UMA-Cell-Identity | | O | O |
| UMA-Location-Area-Identification | | O | O |
| UMA-SGW-IP-Address | O | | |
| UMA-SGW-FQDN | O | | |
| UMA-UNC-IP-Address | O | | |
| UMA-UNC-FQDN | O | | |
| UMA-Serving-UNC-Table-Indicator | | O | |

Notes:
(1) If this parameter is not included, the INC shall act as if 'No limit' was included.

6. Access-Reject Attributes

Table 17 identifies Access-Reject attributes of this embodiment. This table is similar to Table 7 above, except that RADIUS attribute "State" is not used.

TABLE 17

Access-Reject attributes

| RADIUS ATTRIBUTE | DESCRIPTION |
|---|---|
| User-Name | Subscriber IMSI, e.g., 112334123456789 |
| Core Vendor-Specific-Attributes: | |
| URR-Transaction-Type | Type of URR transaction associated with access reject |
| UMA-Discovery-Reject-Cause | Reason for discovery reject |
| UMA-Register-Reject-Cause | Reason for register-reject or register-update reject |
| UMA-TU3902-Timer | |
| UMA-TU3907-Timer | |
| UMA-SGW-IP-Address | |
| UMA-SGW-FQDN | |
| UMA-UNC-IP-Address | |

TABLE 17-continued

Access-Reject attributes

| RADIUS ATTRIBUTE | DESCRIPTION |
|---|---|
| UMA-UNC-FQDN | |
| UMA-Serving-UNC-Table-Indicator | |
| UMA-UMA-PLMN-List | |
| UMA-Location-Blacklist-Indicator | |
| UMA-Location-Area-Identification | |

7. Attribute Presence in Access-Reject Packet

Table 18 identifies attribute presence in Access-Reject packet for this embodiment. This table is similar to Table 8 above, except that RADIUS attribute "State" is not used and there is no Deregister column.

TABLE 18

Attribute Presence in Access-Reject Packet

| | URR-Transaction-Type | | |
|---|---|---|---|
| RADIUS Attributes | Discovery | Register-Request | Register-Update |
| User-Name | M | M | M |
| Vendor-Specific-Attributes: | | | |
| URR-Transaction-Type | M | M | M |
| UMA-Discovery-Reject-Cause | M | | |
| UMA-Register-Reject-Cause | | M | M |
| UMA-TU3902-Timer | O | | |
| UMA-TU3907-Timer | | O | O |
| UMA-SGW-IP-Address | | O | O |
| UMA-SGW-FQDN | | O | O |
| UMA-UNC-IP-Address | | O | O |
| UMA-UNC-FQDN | | O | O |
| UMA-Serving-UNC-Table-Indicator | | O | O |
| UMA-UMA-PLMN-List | | O | O |
| UMA-Location-Blacklist-Indicator | | O | O |
| UMA-Location-Area-Identification | | O | O |

8. Other VSAs

These VSAs are similar to the VSAs described in Sub-section III.C.2 above with the following exceptions. 1) This embodiment does not use Deregister-Info and User-Public-IPv4-Address VSAs. 2) The URR=Transaction-Type does not include Deregister. 3) This embodiment has the extra "Location-Key" VSA.

a) URR-Transaction-Type

The Vendor specific attribute "URR-Transaction-Type" of this embodiment has only three options (0, 1, and 2) as shown below.

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 | 9 | 30 | 1 |
|---|---|---|---|---|---|---|---|---|---|---|---|---|---|---|---|---|---|---|---|---|---|---|---|---|---|---|---|---|---|---|---|
| Type | | | | | | | | | | Length | | | | | | | | | | Vendor-Id | | | | | | | | | | | |
| | | | | Vendor-Id (cont) | | | | | | | | | | | | | | | | | | | | | Vendor-Type | | | | | | |
| Vendor-Length | | | | | | | | | | URR Transaction Type | | | | | | | | | | | | | | | | | | | | | |

Type—The Type field is set to 26
Length—The Length field is set to 1010
Vendor-Id—A value that identifies the vendor. For instance, a specific vendor's Id may be 16445 (0x0000403d)
Vendor-Type—A value that identifies the Type, e.g., a value of 65281 (0xff01) may be used for URR-Transaction-Type
Vendor-Length—The Vendor-Length is set to 4
URR Transaction Type
   0=Discovery
   1=Register-Request
   2=Register-Update
b) Location-Key
This attribute is a key or index to a UMA database record. It is provided by the AAA server to the INC, and by the INC to the GMLC (via the MSC). This allows the GMLC to query the UMA database for location information, for example.

Figure 4A:
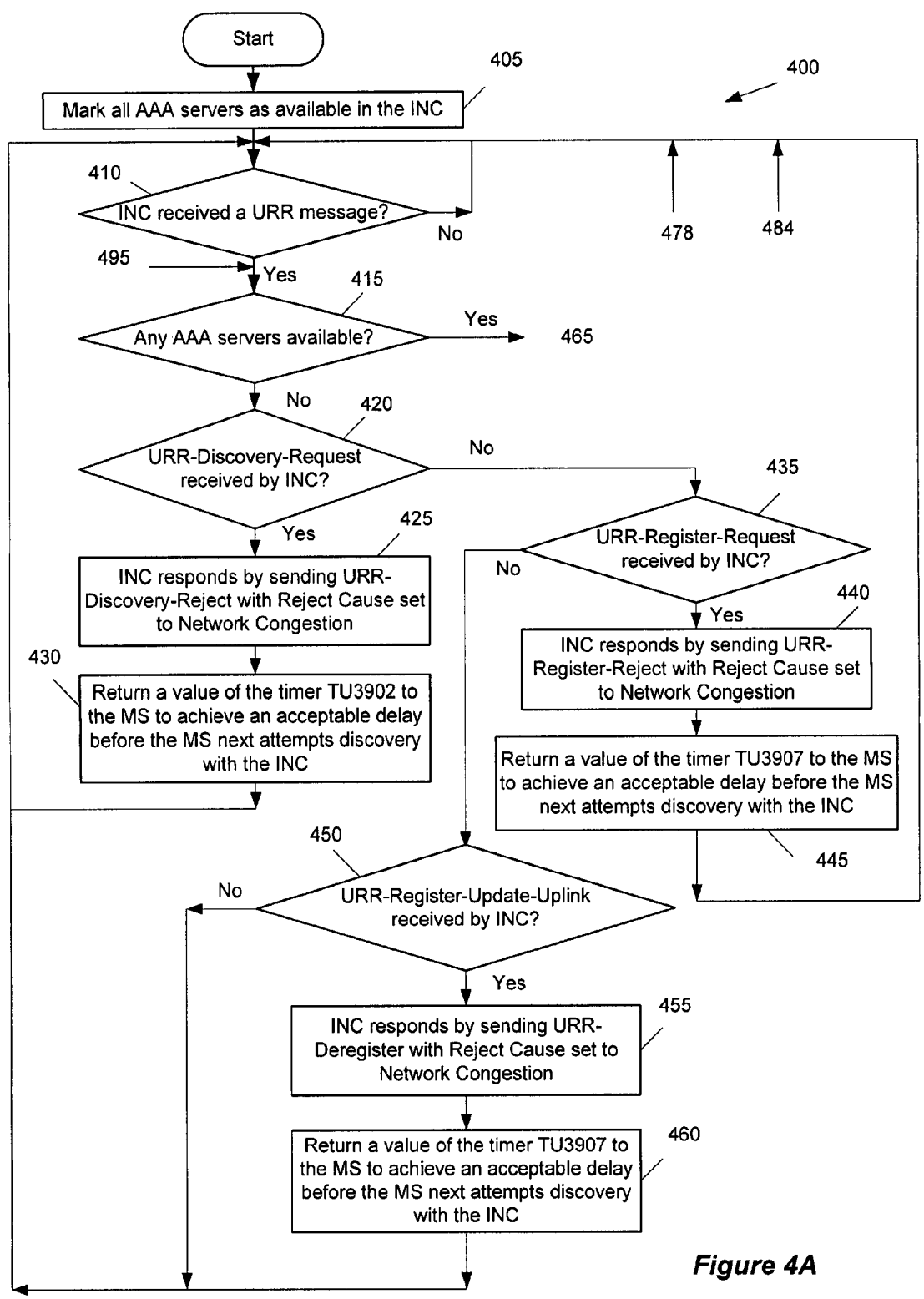
FIG. 4 is a flowchart conceptually illustrating the initialization and new transaction processing by the UNC of some embodiments.
Figure 4B:
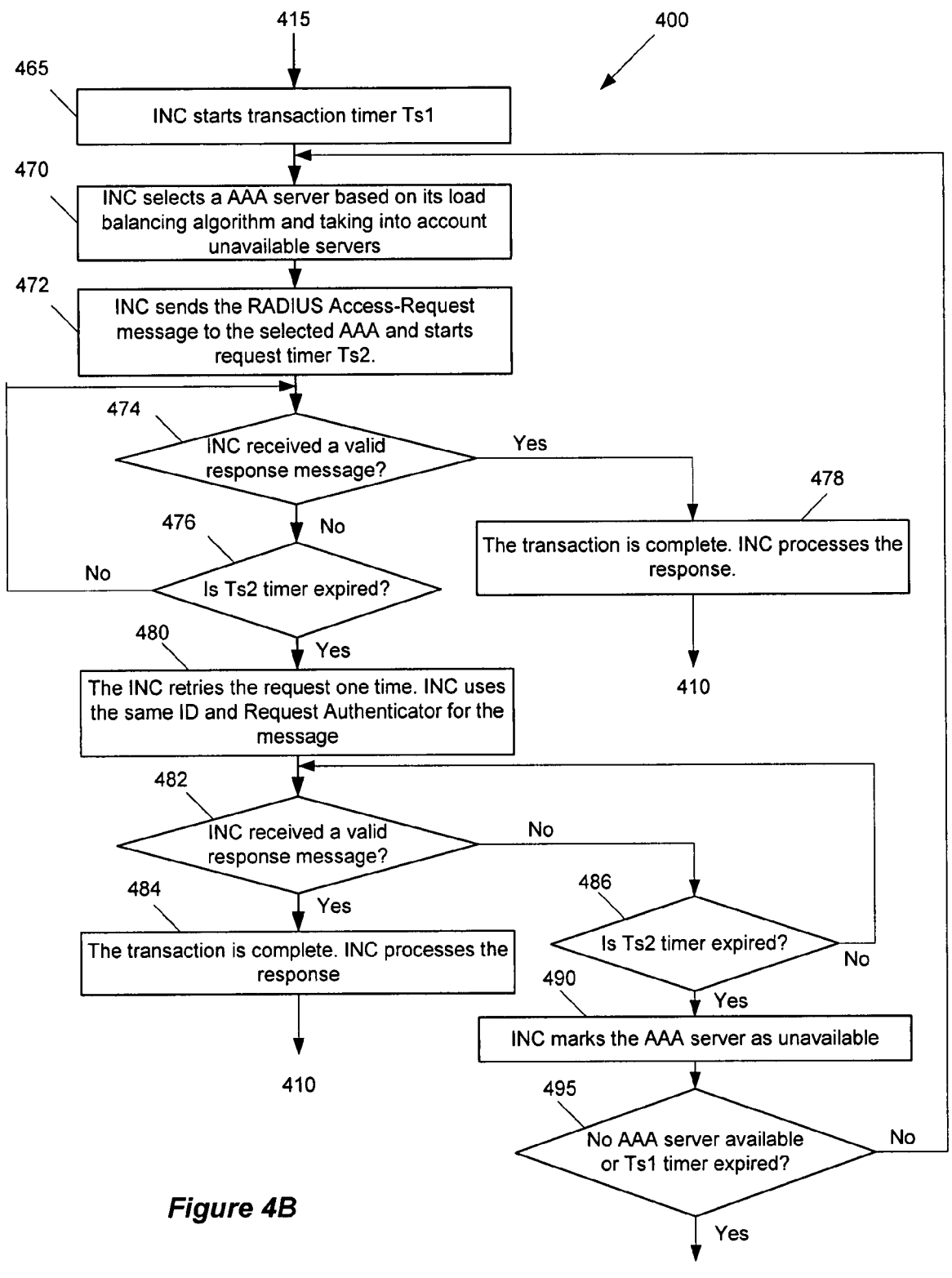

(1) Initialization
As shown in FIG. 4, the INC initially marks (at 405) all AAA servers as 'available'.
(2) New Transaction
When the INC receives a URR message (at 410), the INC performs the following operations in order to send an S1 message for a new transaction. If (at 415) the process determines that a AAA server is available, the process 400 proceeds to 465 which is described below. Otherwise, the process determines (at 420) whether an URR-Discovery-Request was received. If no URR-Discovery-Request was received, the process proceeds to 435 that is described below. Otherwise, the INC responds (at 425) by sending an URR-Discovery-Reject with Reject Cause set to 'Network Congestion'. Next (at 430), the INC chooses a value for the timer TU3902 (which is returned to the MS) to achieve an acceptable delay before the MS next attempts discovery with the INC. Some embodiments have two different TU3902 timer values that

| 00 | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | 6 | 7 | 8 | 9 | 30 | 1 |
|---|---|---|---|---|---|---|---|---|---|---|---|---|---|---|---|---|---|---|---|---|---|---|---|---|---|---|---|---|---|---|---|
| Type | | | | | | | | | | Length | | | | | | | | | | Vendor-Id | | | | | | | | | | | |
| | | | | Vendor-Id (cont) | | | | | | | | | | | | | | | | | | | | | Vendor-Type | | | | | | |
| Vendor-Length | | | | | | | | | | Type of Key | | | | | | | | | | Location Key Value . . . | | | | | | | | | | | |

Type—The Type field is set to 26
Length—The Length field is set to 13
Vendor-Id—A value that identifies the vendor. For instance, a specific vendor's Id may be 16445 (0x0000403d)
Vendor-Type—A value that identifies the Type, e.g., a value of 65282 (0xff02) may be used for URR-Transaction-Type
Vendor-Length—The Vendor-Length is >=5
Type of Key—The Type of Key field is one octet:
   MAC Address (48-bit)
   IPv4 Address (32-bit)
Location Key Value—The Location Key Value is the MAC address or IPv4 address 9. Use of RADIUS Protocol—Procedures This embodiment uses the same procedures as described in Sub-section III.D above, except the following. As shown below, for a new RADIUS transaction procedure 1) there is no S1 message to signal AAA that the MS has been deregistered and 2) the INC does not raise an alarm if the Ts2 timer expires.

a) Deriving the AAA Address

The INC is configured with the IP addresses for the set of AAA servers. DNS is not used to resolve the AAA address.

b) RADIUS Transaction Procedures

The RADIUS transaction procedures are 1) initialization, 2) new transaction, 3) AAA server load balancing, and 4) AAA server availability management. The initialization and new transaction procedures will now be described by reference to the process 400 illustrated in FIG. 4 that conceptually shows the flow of operations performed by the INC during these procedures.

can be configured in the INC; one for "normal" congestion and another to handle this case. The process 400 then proceeds back to 410.

If (after 420) the process proceeds to 435, the process checks whether an URR-Register-Request was received by the INC. If no URR-Register-Request was received, the process proceeds to 450 that is described below. Otherwise, the INC sends (at 440) an URR-Register-Reject with Reject Cause set to 'Network Congestion'. Next (at 445), the INC chooses a value for the timer TU3907 (which is returned to the MS) to achieve an acceptable delay before the MS next attempts to register with the INC. The process 400 then proceeds back to 410.

If (after 435) the process proceeds to 450, the process checks whether an URR-Register-Update-Uplink was received by the INC. If no URR-Register-Update-Uplink was received, the process proceeds back to 410. Otherwise, the INC sends (at 455) an URR-Deregister with Reject Cause set to 'Network Congestion'. Next (at 460), the INC chooses a value for the timer TU3907 (which is returned to the MS) to achieve an acceptable delay before the MS next attempts to register with the INC. The process 400 then proceeds back to 410.

If (after 415) the process 400 determines that a AAA server is available, the INC starts (at 465) the transaction timer Ts1. Next (at 470), the INC selects a AAA server based on its load balancing algorithm and taking into account "unavailable" servers. Next (at 472), the INC sends the RADIUS Access-Request message to the selected AAA server and starts request timer Ts2.

Next (at 474), the process 400 checks whether the INC has received a valid response message. If a valid response was received, the transaction is complete and the INC processes (at 478) the response per Section IV above (subject to the differences described in Sub-section VI.B. below). The process then proceeds back to 410 which was described above. Otherwise, the process checks (at 476) whether the timer Ts2 has expired. If the timer has not expired, the process proceeds back to 474. Otherwise, the INC retries (at 480) the request for one time. The retried message contains the same ID and Request Authenticator.

Next (at 482), the process checks whether the INC has received a valid response message. If the INC has received a valid response message, the transaction is complete and the INC processes (at 484) the response per Section IV above (subject to the differences described in Sub-section VI.B. below). The process then proceeds back to 410 which was described above. Otherwise, the process checks (at 486) whether the timer Ts2 has expired. If the timer has not expired, the process returns to 482. Otherwise, the INC marks (at 490) the AAA server as 'unavailable'.

Next (at 495), the process checks whether no AAA servers are available or timer Ts1 has expired. If no AAA servers are available or timer Ts1 has expired, the process proceeds to 415 which was described above. Otherwise, the process proceeds to 470 to select another AAA server. The AAA server processes the received message and responds as described in Section IV above (subject to the differences described in Sub-section VI.B. below).

(3) AAA Server Load Balancing

Several AAA server load balancing procedures (e.g., round robin) are used by the INC.

(4) AAA Server Availability Management

These procedures are used to move AAA servers from the 'unavailable' state to the 'available' state. For instance, the INC may periodically check the status of the AAA servers that were marked as 'unavailable' and if a server responds, the INC will mark it as 'available'.

B. S1 Service Access Control Procedures

This embodiment uses the same S1 Service Access Control procedures as described in Section IV above with the following exceptions. As shown below, in this embodiment, the AAA does not perform the "Set Termination-Action" during Register-Request transaction processing. Consequently, the INC processing does not include processing for Termination-Action attribute. Also, the INC does not store UMA-Geographical-Location. In some variation of this embodiment, the AAA server may have access to the logic and data to perform the UNC selection process or to perform UMA redirection process, as described below.

1. Discovery Transaction

The discovery transaction of this embodiment is similar to the embodiment described in Section III above. Except that in some variation of this embodiment, the AAA server may have access to the logic and data to perform the UNC selection process; e.g., based on the GSM CGI received or the location of the access point, the AAA server is able to determine the Default UNC and SEGW to assign to the MS. In this case, the AAA returns the UNC/SEGW address information in the Access-Accept.

2. Register-Request Transaction Processing by the AAA

The AAA performs one or more of the following procedures when it receives the Access-Request message from the INC with the URR-Transaction-Type attribute set to 'Register-Request' (i.e., starting from the first procedure, then branching as necessary):

1. Register-Request: Check if IMSI is authorized

2. Register-Request: Check if AP is authorized

3. Send Register Accept

4. Send Register Reject

3. Send Register Accept Procedure

The AAA sends the RADIUS Access-Accept message to the requesting INC using the procedures described in Sub-section III.D. The AAA may include attributes retrieved from the UMA Database, as defined in Sub-section IIIB.2. The URR-Transaction-Type attribute is set to 'Register-Request'. The AAA then considers the transaction complete.

4. INC Receives Register Accept from AAA

When the INC receives the RADIUS Access-Accept (Register-Request) message from the AAA, it considers the S1 transaction complete and continues with its processing of the URR REGISTER REQUEST, including:

If the UMA-Location-Status attribute is included, then the INC shall store it as the current Location Status and send it to the MS; otherwise, the Location Status IE is not sent to the MS.

5. Variations for Register-Request Transaction

In some variations of this embodiment, the AAA server may have access to the logic and data to perform the UMA redirection process; e.g., based on the GSM CGI received or the location of the access point, the AAA server is able to determine the Serving UNC and SEGW to which the MS should be redirected. In this case, the AAA returns the UNC/SEGW address information in the Access-Reject message (with UMA-Register-Reject-Cause=Redirection).

The AAA server may have access to the logic and data to perform the GSM blacklist processing; e.g., based on the GSM CGI received, the AAA server is able to determine that UMA access is not allowed in the area. In this case, the AAA returns the blacklist information in the Access-Reject message (with UMA-Register-Reject-Cause=Location Not Allowed).

6. Send Register Update Accept Procedure

The AAA sends the RADIUS Access-Accept message to the requesting INC using the procedures described in Sub-section III.D. The AAA may include attributes retrieved from the UMA Database, as defined in Sub-section III.B.1. The URR-Transaction-Type attribute is set to 'Register-Update'. The AAA then considers the transaction complete.

7. INC Receives Register Update Accept from AAA

When the INC receives the RADIUS Access-Accept (Register-Update) message from the AAA, it considers the S1 transaction complete.

If the UMA-Location-Status attribute is included and is different from the stored location status, then the INC shall send the updated Location Status to the MS in a URR REGISTER UPDATE DOWNLINK message; otherwise, location status is not sent to the MS.

8. INC Receives Register Update Reject from AAA

When the INC receives the RADIUS Access-Reject (Register-Update) message from the AAA, it considers the S1 transaction complete. The INC then initiates the URR Deregistration procedure using the cause provided by the AAA server.

9. Variations to Register-Update Transaction

The AAA server may have access to the logic and data to perform the UMA redirection process; e.g., based on the GSM CGI received or the location of the access point, the AAA server is able to determine the Serving UNC and SEGW to which the MS should be redirected. In this case, the AAA returns the UNC/SEGW address information in the Access-Reject message (with UMA-Register-Reject-Cause=Redirection).

The AAA server may have access to the logic and data to perform the GSM blacklist processing; e.g., based on the GSM CGI received, the AAA server is able to determine that UMA access is not allowed in the area. In this case, the AAA returns the blacklist information in the Access-Reject message (with UMA-Register-Reject-Cause=Location Not Allowed).

10. S1 Accounting Procedures

RADIUS accounting-based procedures for S1 (e.g., to support AAA-based session control) may be defined in some variations of this embodiment.

C. Configuration Parameters

AAA Parameters

Table 19 summarizes the configuration parameters that apply to the S1 interface and associated processing at the AAA. This table is similar to Table 11, except this table does not include a Request Deregistration Notification parameter.

TABLE 19

Configuration Parameters that Apply to the S1 Interface and Associated Processing at the AAA.

| Name | Format | Values | Default | Description |
| --- | --- | --- | --- | --- |
| Check IMSI on Discovery | Boolean | Yes or No | Yes | See Sub-section IV.A.2.a |
| Check AP on Discovery | Boolean | Yes or No | Yes | See Sub-section IV.A.2.b |
| Check IMSI on Register Request | Boolean | Yes or No | Yes | See Sub-section IV.A.2.a |
| Check AP on Register Request | Boolean | Yes or No | Yes | See Sub-section IV.B.2.b |
| Check AP on Register-Update | Boolean | Yes or No | Yes | See Sub-section IV.C.2.a |
| TU3902 Timer | Binary | | | See [UMA P, section 11.2.24] |
| TU3907 Timer | Binary | | | See [UMA P, section 11.2.16] |

VII. Alternative Embodiments Utilizing a Service Provisioning Server Scope

These embodiments utilize UMA Service Control Protocol (USCP), defined below, for application layer signaling. The following sub-sections define the architecture and the protocols used in this embodiment.

A. Architecture

Figure 5:
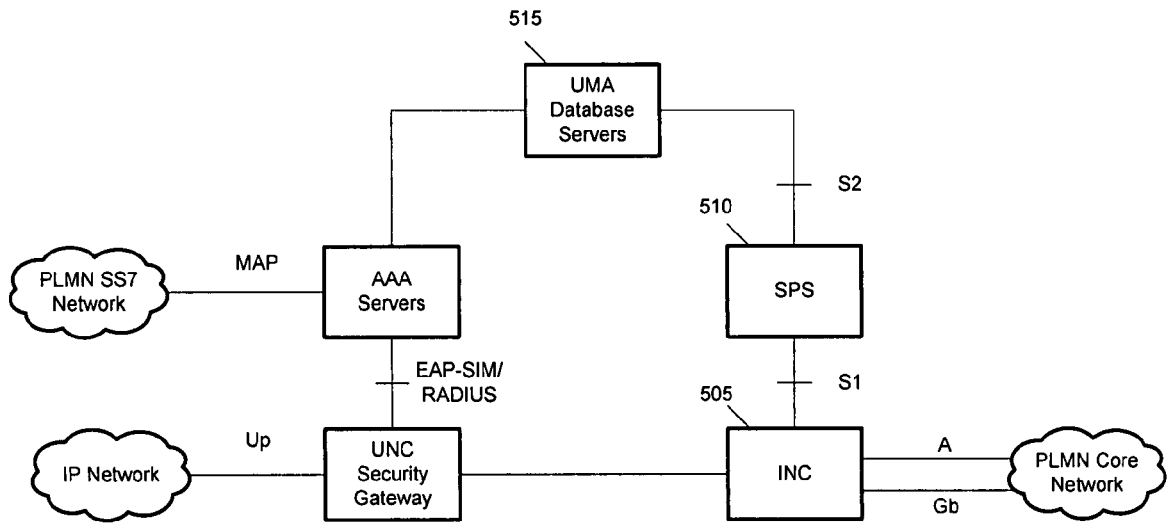
FIG. 5 illustrates the S1 interface of some embodiments.

The overall system in which these embodiments are implemented is similar to the system illustrated in FIG. 1 above, except that in these embodiments, instead of the AAA server 140, a Service Provisioning Server (SPS) is utilized. The S1 interface for these embodiments is illustrated in FIG. 5. The interface is between the INC 505 and the SPS 510 and supports the UMA Discovery and Registration related procedures. Also shown is the S2 interface which supports SPS access to the various database tables (not shown) on one or more UMA database servers 515.

Figure 6:
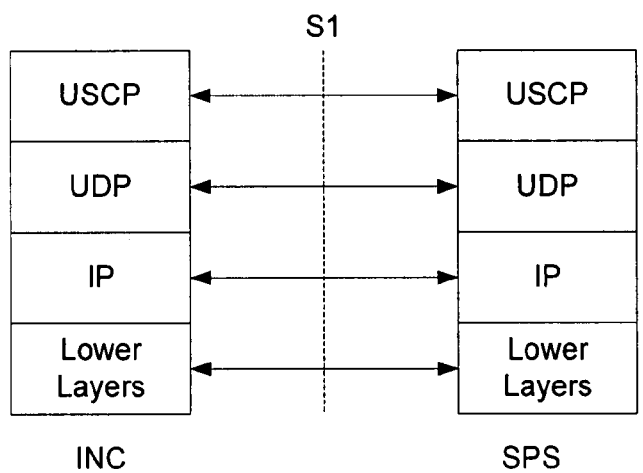
FIG. 6 illustrates the S1 protocol structure of some embodiments.

The S1 protocol structure is illustrated in FIG. 6. The "UMA Service Control Protocol" (USCP) supports the application layer signaling functions between the INC and SPS. The USCP uses UDP transport.

The default USCP UDP port number is specified in Sub-section VII.D.1 below. The S1 interface uses standard UDP procedures. Exactly one USCP message is encapsulated in each UDP packet. The S1 interface supports IPv4. Some embodiments utilize IPSec to secure communication between the INC and SPS.

B. UMA Service Control Protocol (USCP)

1. Overview

The UMA Service Control Protocol exposes the INC internal interface to an external, UDP-based interface, and adds the following transaction management capabilities:

Transaction identifiers for explicit transaction management

Transaction timeout and retry

Management of communication with multiple SPS USCP servers (e.g., primary and secondary)

Management of interface connectivity testing

The INC internal interface is hereinafter referred to as the R10 interface. The R10 messages in effect convey the same information as the messages (such as UMA RR request messages received from the mobile station) received through the Up interface.

2. Messages

The USCP protocol message format consists of the following elements:

1. Message Type—The USCP message types are listed in Table 20.
2. Message Length—The length of the message, including the message type, length, version, transaction ID and parameters, coded in two octets. Octets outside the range of the Message Length field must be ignored on reception. If the packet is shorter than the Message Length field, it must be silently discarded.
3. Version—The version of the USCP protocol. This shall be set to the value 1.
4. Transaction ID—Used to allow matching of requests and replies, and coded in four octets. Note that USC REQUEST/RESPONSE Transaction IDs may overlap with TEST REQUEST/RESPONSE Transaction IDs; i.e., there is no need to coordinate the two Transaction ID pools.
5. A set of parameters where each parameter is coded as follows:
   a. Type—The type field is one octet. The parameter types are listed in Table 21.
   b. Length—The length of the parameter, including the Type, Length and Value fields, coded in one octet.
   c. Value—The value of the parameter.

Table 20 identifies the USCP message types utilized by this embodiment.

TABLE 20

USCP message types

| USCP MESSAGE NAME | MESSAGE TYPE |
| --- | --- |
| USC REQUEST | 0000 0000 (0x00) |
| USC RESPONSE | 0000 0001 (0x01) |
| TEST REQUEST | 0000 0010 (0x02) |
| TEST RESPONSE | 0000 0011 (0x03) |

Table 21 identifies the USCP parameter types utilized by this embodiment.

TABLE 21

USCP parameter types

| USCP Parameter NAME | TYPE |
| --- | --- |
| R10 Message | 0000 0000 (0x00) |
| USCP Server State | 0000 0001 (0x01) | a) USC Request

This message may be sent by the INC to the SPS or by the SPS to the INC. Table 22 identifies USC REQUEST message attributes.

TABLE 22

USC REQUEST

| IEI | Information Element | Type/Reference | Presence | Format | Length | Value |
|---|---|---|---|---|---|---|
| | USC REQUEST Message Type | Message Type | M | V | 1 | See Table 20 |
| | Length | Message Length | M | V | 2 | |
| | Version | Version | M | V | 1 | |
| | Transaction ID | Transaction ID | M | V | 4 | |
| 0 | R10 Message | R10 Message | O | TLV | variable | |

Note:
The use of the R10 Message parameter is optional in some variations of this embodiment. An Information Element Identifier (IEI) is a unique identity which enables a given information element to be determined within the operating context.

b) USC Response

This message may be sent by the INC to the SPS or by the SPS to the INC, in response to a USC REQUEST. Table 23 identifies the USC RESPONSE message attributes.

TABLE 23

USC RESPONSE

| IEI | Information Element | Type/Reference | Presence | Format | Length | Value |
|---|---|---|---|---|---|---|
| | USC RESPONSE Message Type | Message Type | M | V | 1 | See Table 20 |
| | Length | Message Length | M | V | 2 | |
| | Version | Version | M | V | 1 | |
| | Transaction ID | Transaction ID | M | V | 4 | |
| 0 | R10 Message | R10 Message | O | TLV | variable | |
| 1 | USCP Server State | USCP Server State | O | TV | 1 | |

Note:
The R10 Message parameter OR the USCP Server State parameter may be present in the message, but not both.

c) Test Request

This message may be sent by the INC to the SPS or by the SPS to the INC. Table 24 identifies TEST REQUEST message attributes.

TABLE 24

TEST REQUEST

| IEI | Information Element | Type/Reference | Presence | Format | Length | Value |
|---|---|---|---|---|---|---|
| | TEST REQUEST Message Type | Message Type | M | V | 1 | See Table 20 |
| | Version | Version | M | V | 1 | |
| | Length | Message Length | M | V | 2 | |
| | Transaction ID | Transaction ID | M | V | 4 | | d) Test Response

This message may be sent by the INC to the SPS or by the SPS to the INC, in response to a TEST REQUEST. Table 25 identifies TEST RESPONSE message attributes.

TABLE 25

TEST RESPONSE

| IEI | Information Element | Type/Reference | Presence | Format | Length | Value |
|---|---|---|---|---|---|---|
| | TEST RESPONSE Message Type | Message Type | M | V | 1 | See Table 20 |

TABLE 25-continued

TEST RESPONSE

| IEI | Information Element | Type/Reference | Presence | Format | Length | Value |
|---|---|---|---|---|---|---|
|  | Length | Message Length | M | V | 2 |  |
|  | Version | Version | M | V | 1 |  |
|  | Transaction ID | Transaction ID | M | V | 4 |  |
| 1 | USCP Server State | USCP Server State | O | TV | 1 |  |

3. Parameters a) R10 Message

The R10 Message IE contents are illustrated below:

| Bit 8 | Bit 7 | Bit 6 | Bit 5 | Bit 4 | Bit 3 | Bit 2 | Bit 1 |
|---|---|---|---|---|---|---|---|
| R10 Message Type (octet 1) ||||||||
| R10 Message Length (octet 2-3) ||||||||
| R10 Version (octet 4) ||||||||
| R10 Message Value (octets 5-n) ||||||||

The R10 Version is set to the value 1.

The R10 Message Value contains the R10 message structure, including the R10 message identifier, length and parameters.

b) USCP Server State

The USCP Server State IE is illustrated below:

| Bit 8 | Bit 7 | Bit 6 | Bit 5 | Bit 4 | Bit 3 | Bit 2 | Bit 1 |
|---|---|---|---|---|---|---|---|
| USCP Server State Type (octet 1) ||||||||
| USCP Server State Value (octets 2) ||||||||

Table 26 identifies the USCP Server State values.

TABLE 26

USCP Server State Values

| Bit |||||||| Description |
| 8 | 7 | 6 | 5 | 4 | 3 | 2 | 1 |  |
|---|---|---|---|---|---|---|---|---|
| 0 | 0 | 0 | 0 | 0 | 0 | 0 | 0 | Server is in ready state |
| 0 | 0 | 0 | 0 | 0 | 0 | 0 | 1 | Server is in maintenance busy state |
| 0 | 0 | 0 | 0 | 0 | 0 | 1 | 0 | Server is in overload state |

All other values shall be treated as 'Server is in maintenance busy state'

4. Procedures a) Deriving the SPS Address

The INC is configured with either FQDNs or IP addresses (but not both) for the primary and secondary SPS. If FQDNs are configured, the INC uses DNS to resolve the SPS address.

b) USC Request Procedures

The USCP client is normally the INC but may be the SPS for certain R10 messages; likewise, either INC or SPS could be the USCP server.

c) INC Procedures

When the INC has a R10 message to send (i.e., for a new transaction), it does the following:

1. If the primary SPS is in the ready state, the INC sends a USC-REQUEST message to the primary SPS and starts timer Ts1. Possible outcomes are:

a. If the INC receives a valid USC-RESPONSE message containing a R10 message, then the transaction is complete.

b. If the INC receives a valid USC-RESPONSE message indicating that the server is in the maintenance busy state, then the INC switches to the secondary SPS and goes to step 2 below. The INC flags the primary SPS as being "maintenance busy" which may trigger periodic background connectivity tests. The INC raises a major alarm.

c. If the INC receives a valid USC-RESPONSE message indicating that the server is in the overload state, then the INC switches to the secondary SPS and goes to step 2 below. The INC flags the primary SPS as being "overloaded" which may cause the INC to apply "gapping" for future requests to the SPS (e.g., to use the secondary exclusively for the next 15 seconds). The INC raises a minor alarm.

d. If timer Ts1 expires, the INC retries the request one time (i.e., using the same transaction ID). Possible outcomes are:

i. If the INC receives a valid USC-RESPONSE message containing a R10 message, then the transaction is complete.

ii. If the INC receives a valid USC-RESPONSE message indicating that the server is in the maintenance busy state, then the INC switches to the secondary SPS and goes to step 2 below. The INC flags the primary SPS as being "maintenance busy". The INC raises a major alarm.

iii. If the INC receives a valid USC-RESPONSE message indicating that the server is in the overload state, then the INC switches to the secondary SPS and goes to step 2 below. The INC flags the primary SPS as being "overloaded". The INC raises a minor alarm.

iv. If Ts1 expires, then the INC switches to the secondary SPS and goes to step 2 below. The INC flags the primary SPS as being "offline" which may trigger periodic background connectivity tests. The INC raises a major alarm.

2. If the primary SPS is not in the ready state but the secondary SPS is in the ready state, the INC sends a USC-REQUEST message to the secondary SPS and starts timer Ts1. Possible outcomes are:

a. If the INC receives a valid USC-RESPONSE message containing a R10 message, then the transaction is complete.

b. If the INC receives a valid USC-RESPONSE message indicating that the server is in the maintenance busy state, then the INC declares an S1 communications error. The INC flags the secondary SPS as being "maintenance busy" which may trigger periodic background connectivity tests. The INC raises a critical alarm.
c. If the INC receives a valid USC-RESPONSE message indicating that the server is in the overload state, then the INC declares a UNC congestion condition. The INC flags the secondary SPS as being "overloaded". The INC raises a critical alarm.
d. If timer Ts1 expires, the INC retries the request one time (i.e., using the same transaction ID). Possible outcomes are:
   i. If the INC receives a valid USC-RESPONSE message containing a R10 message, then the transaction is complete.
   ii. If the INC receives a valid USC-RESPONSE message indicating that the server is in the maintenance busy state, then the INC declares an S1 communications error. The INC flags the secondary SPS as being "maintenance busy" which may trigger periodic background connectivity tests. The INC raises a critical alarm.
   iii. If the INC receives a valid USC-RESPONSE message indicating that the server is in the overload state, then the INC declares a UNC congestion condition. The INC flags the secondary SPS as being "overloaded". The INC raises a critical alarm.
   iv. If Ts1 expires, then the INC declares an S1 communications error. The INC flags the secondary SPS as being "offline" which may trigger periodic background connectivity tests. The INC raises a critical alarm.

d) SPS Procedures

When the SPS receives a USC-REQUEST message, it does the following:

1. If the SPS is in the ready state, it processes the R10 Message and sends the resulting R10 Message in a USC-RESPONSE message to the requesting INC (i.e., to the INC identified by the source IP and Port associated with the USC-REQUEST).
   a. If the Transaction ID is the same as for an ongoing transaction (i.e., R10 Message processing is in progress), the SPS shall silently discard the new message.

2. If the SPS is in the maintenance busy state, then it sends the USC-RESPONSE message to the requesting INC, including the USCP Server State IE.

3. If the SPS is in the overload state, then it sends the USC-RESPONSE message to the requesting INC, including the USCP Server State IE.

4. If the SPS experiences a failure, but can still respond to the INC, then it sends the USC-RESPONSE message to the requesting INC, including the USCP Server State IE set to the value 'Server is in overload state'.

D. R10 Protocol

1. Overview

The UMA Service Control Protocol effectively externalizes the INC R10 internal interface and protocol. The R10 protocol allows the INC to get UMA service control instructions and data (e.g., for discovery and registration handling purposes) from the external SPS, rather than locally.

2. Messages

The R10 messages include the R10 message identifier, length and parameters. In general, the R10 messages use a fixed size structure, where all parameters are always included (in the order listed) and have fixed sizes. However, the first octet of each "optional" parameter represents the length of the significant portion of the remaining parameter contents; i.e., if the first octet is zero, then the remaining octets in the parameter should be disregarded. Table 27 lists the R10 message identifier values.

TABLE 27

R10 Message Identifiers

| R10 MESSAGE NAME | MESSAGE ID |
|---|---|
| R10 DISCOVERY REQUEST | 0000 0000 (0x00) |
| R10 DISCOVERY ACCEPT | 0000 0001 (0x01) |
| R10 DISCOVERY REJECT | 0000 0010 (0x02) |
| R10 REGISTER REQUEST | 0000 0011 (0x03) |
| R10 REGISTER ACCEPT | 0000 0100 (0x04) |
| R10 REGISTER REDIRECT | 0000 0101 (0x05) |
| R10 REGISTER REJECT | 0000 0110 (0x06) |
| R10 REGISTER UPDATE UPLINK | 0000 0111 (0x07) |
| R10 REGISTER UPDATE DOWNLINK | 0000 1000 (0x08) |
| R10 DEREGISTER FROM INC | 0000 1001 (0x09) |
| R10 DEREGISTER FROM SPS | 0000 1010 (0x0A) | a) R10 Discovery Request

This message may be sent by the INC to the SPS. Table 28 identifies R10 DISCOVERY REQUEST attributes.

TABLE 28

R10 DISCOVERY REQUEST

| Information IEI Element | Type/Reference (Note 1) | Presence (Note 1) | Format | Length | Value |
|---|---|---|---|---|---|
| R10 DISCOVERY REQUEST Message Type | Message Type | M | V | 1 | |
| Length | Message Length | M | V | 2 | Not including Message Type or Length fields |
| IMSI | Mobile Identity 11.2.1 | M | V | 9 | See Note 1 |

TABLE 28-continued

R10 DISCOVERY REQUEST

| IEI | Information Element | Type/Reference (Note 1) | Presence (Note 1) | Format | Length | Value |
|---|---|---|---|---|---|---|
| | UMA Release Indicator | UMA Release Indicator 11.2.2 | M | V | 1 | See Note 1 |
| | UMA Classmark | UMA Classmark 11.2.7 | M | V | 1 | See Note 1 |
| | GSM Coverage Indicator | GSM Coverage Indicator 11.2.6 | M | V | 1 | See Note 1 |
| | AP Radio Identity | Radio Identity 11.2.3 | O | V | 8 | See Note 1 |
| | Cell Identity | Cell Identity 11.2.4 | O | V | 3 | See Note 1 |
| | Location Area Identification | Location Area Identification 11.2.5 | O | V | 6 | See Note 1 |
| | Routing Area Code | Routing Area Code 11.2.41 | O | V | 2 | See Note 1 |
| | Register Reject Cause | Register Reject Cause 11.2.21 | O | V | 2 | See Note 1 |
| | Redirection Counter | Redirection Counter 11.2.11 | O | V | 2 | See Note 1 |
| | Default SGW IP address | IP Address 11.2.9 | O | V | 5 | See Note 1 |
| | Default UNC IP address | IP Address 11.2.9 | O | V | 5 | See Note 1 |
| | Default SGW FQDN Length | See Note 2 | O | V | 1 | See Note 2 |
| | Default UNC FQDN Length | See Note 2 | O | V | 1 | See Note 2 |
| | Data Block | See Note 2 | O | V | 0-512 | See Note 2 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] andthe reference is to the appropriate section in [UMA P]. Optional (O) parameters (i.e., with significant content) are included by the INC.
2. If FQDNs are used instead of IP addresses, then the 'Default SGW FQDN Length' and 'Default UNC FQDN Length' parameters will contain the length of the SGW and UNC FQDNs, respectively. The two FQDNs are then concatenated and included in the 'Data Block' parameter. If IP addresses are used, then the lengths are set to zero and the Data Block parameter is not included.

b) R10 Discovery Accept

This message may be sent by the SPS to the INC. Table 29 identifies R10 DISCOVERY ACCEPT message attributes.

TABLE 29

R10 DISCOVERY ACCEPT

| IEI | Information Element | Type/Reference (Note 1) | Presence (Note 1) | Format | Length | Value |
|---|---|---|---|---|---|---|
| | R10 DISCOVERY ACCEPT Message Type | Message Type | M | V | 1 | |
| | Length | Message Length | M | V | 2 | Not including Message Type or Length fields |
| | Default UNC SGW IP address | IP Address 11.2.9 | O | V | 5 | See Note 1 |
| | Default UNC IP address | IP Address 11.2.9 | O | V | 5 | See Note 1 |
| | Default SGW FQDN Length | See Note 2 | O | V | 1 | See Note 2 |

TABLE 29-continued

R10 DISCOVERY ACCEPT

| IEI | Information Element | Type/Reference (Note 1) | Presence (Note 1) | Format | Length | Value |
|---|---|---|---|---|---|---|
| | Default UNC FQDN Length | See Note 2 | O | V | 1 | See Note 2 |
| | Data Block | See Note 2 | O | V | 0-512 | See Note 2 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the referenceis to the appropriate section in [UMA P]. Optional (O) parameters (i.e., with significant content) are included by the SPS.
2. If FQDNs are used instead of IP addresses, then the 'Default SGW FQDN Length' and 'Default UNC FQDN Length' parameters will contain the length of the SGW and UNC FQDNs, respectively. The two FQDNs are then concatenated and included in the 'Data Block' parameter. If IP addresses are used, then the lengths are set to zero and the Data Block parameter is not included.

c) R10 Discovery Reject

This message may be sent by the SPS to the INC. Table 30 identifies R10 DISCOVERY REJECT message attributes.

TABLE 30

R10 DISCOVERY REJECT

| IEI | Information Element | Type/Reference (Note 1) | Presence (Note 1) | Format | Length | Value |
|---|---|---|---|---|---|---|
| | R10 DISCOVERY REJECT Message Type | Message Type | M | V | 1 | |
| | Length | Message Length | M | V | 2 | Not including Message Type or Length fields |
| | Discovery Reject Cause | Discovery Reject Cause 11.2.12 | M | V | 1 | See Note 1 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference is to theappropriate section in [UMA P]. Optional (O) parameters (i.e., with significant content) are included by the SPS.

d) R10 Register Request

This message may be sent by the INC to the SPS. Table 31 identifies R10 REGISTER REQUEST message attributes.

TABLE 31

R10 REGISTER REQUEST

| IEI | Information Element | Type/Reference (Note 1) | Presence (Note 1) | Format | Length | Value |
|---|---|---|---|---|---|---|
| | R10 REGISTER REQUEST Message Type | Message Type | M | V | 1 | |
| | Length | Message Length | M | V | 2 | Not including Message Type or Length fields |
| | IMSI | Mobile Identity 11.2.1 | M | V | 9 | See Note 1 |
| | UMA Release Indicator | UMA Release Indicator 11.2.2 | M | V | 1 | See Note 1 |

TABLE 31-continued

R10 REGISTER REQUEST

| IEI | Information Element | Type/Reference (Note 1) | Presence (Note 1) | Format | Length | Value |
|---|---|---|---|---|---|---|
| | UMA Classmark | UMA Classmark 11.2.7 | M | V | 1 | See Note 1 |
| | GSM RR State | GSM RR State 11.2.17 | M | V | 1 | See Note 1 |
| | Coverage Indication | GSM Coverage Indicator 11.2.6 | M | V | 1 | See Note 1 |
| | MS Radio identity | Radio Identity 11.2.3 | M | V | 7 | See Note 1 |
| | AP Radio Identity | Radio Identity 11.2.3 | O | V | 8 | See Note 1 |
| | Cell Identity | Cell Identity 11.2.4 | O | V | 3 | See Note 1 |
| | Location Area Identification | Location Area Identification 11.2.5 | O | V | 6 | See Note 1 |
| | Routing Area Code | Routing Area Code 11.2.41 | O | V | 2 | See Note 1 |
| | Geographic Location | Geographical Location 11.2.8 | O | V | 5 | See Note 1 |
| | Register Reject Cause | Register Reject Cause 11.2.21 | O | V | 2 | See Note 1 |
| | Redirection Counter | Redirection Counter 11.2.11 | O | V | 2 | See Note 1 |
| | Last UNC SGW IP address | IP Address 11.2.9 | O | V | 5 | See Note 1 |
| | Last UNC IP address | IP Address 11.2.9 | O | V | 5 | See Note 1 |
| | AP Location Length | See Note 2 | O | V | 1 | See Note 2 |
| | Last UNC SGW FQDN Length | See Note 2 | O | V | 1 | See Note 2 |
| | Last UNC FQDN Length | See Note 2 | O | V | 1 | See Note 2 |
| | Data Block | See Note 2 | O | V | 0-1024 | See Note 2 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference is to the appropriate section in [UMA P]. Optional (O) parameters (i.e., with significant content) are included by the INC.
2. If AP location is included then the 'AP Location Length' parameter will contain the length of the AP Location. If FQDNs are used instead of IP addresses, then the 'Default SGW FQDN Length' and 'Default UNC FQDN Length' parameters will contain the length of the SGW and UNC FQDNs, respectively. If present, the AP Location and the two FQDNs are then concatenated and included in the 'Data Block' parameter. If IP addresses are used and no APLocation is included, then the lengths are set to zero and the Data Block parameter is not included.

e) R10 Register Accept

This message may be sent by the SPS to the INC. Table 32 identifies R10 REGISTER ACCEPT message attributes.

TABLE 32

R10 REGISTER ACCEPT

| IEI | Information Element | Type/Reference (Note 1) | Presence (Note 1) | Format | Length | Value |
|---|---|---|---|---|---|---|
| | R10 REGISTER ACCEPT Message Type | Message Type | M | V | 1 | |
| | Length | Message Length | M | V | 2 | Not including Message Type or Length fields |
| | Cell Identity | Cell Identity 11.2.4 | M | V | 2 | See Note 1 |
| | Location Area Identification | Location Area Identification 11.2.5 | M | V | 5 | See Note 1 |

TABLE 32-continued

R10 REGISTER ACCEPT

| IEI | Information Element | Type/Reference (Note 1) | Presence (Note 1) | Format | Length | Value |
|---|---|---|---|---|---|---|
| | Location Status | Location Status 11.2.44 | M | V | 1 | See Note 1 |
| | Geographic Location | Geographical Location 11.2.8 | O | V | 5 | See Note 1 |
| | Billing Cell Identity | Cell Identity 11.2.4 | O | V | 3 | See Notes 1, 2 |
| | Billing Location Area Identification | Location Area Identification 11.2.5 | O | V | 6 | See Notes 1, 2 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference is to the appropriate section in [UMA P]. Optional (O) parameters (i.e., with significant content) are included by the SPS.
2. The Billing Cell Identity and Billing Location Area Identification parameters are included if stored in the UMA Database (e.g., in the Subscriber Table).

f) R10 Register Redirect

This message may be sent by the SPS to the INC. Table 33 identifies R10 REGISTER REDIRECT message attributes.

TABLE 33

R10 REGISTER REDIRECT

| IEI | Information Element | Type/Reference (Note 1) | Presence (Note 1) | Format | Length | Value |
|---|---|---|---|---|---|---|
| | R10 REGISTER REDIRECT Message Type | Message Type | M | V | 1 | |
| | Length | Message Length | M | V | 2 | Not including Message Type or Length fields |
| | Serving UNC SGW IP address | IP Address 11.2.9 | O | V | 5 | See Note 1 |
| | Serving UNC IP address | IP Address 11.2.9 | O | V | 5 | See Note 1 |
| | Serving SGW FQDN Length | See Note 2 | O | V | 1 | See Note 2 |
| | Serving UNC FQDN Length | See Note 2 | O | V | 1 | See Note 2 |
| | Data Block | See Note 2 | O | V | 0-512 | See Note 2 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference is to the appropriate section in [UMA P]. Optional (O) parameters (i.e., with significant content) are included by the SPS.
2. If FQDNs are used instead of IP addresses, then the 'Serving SGW FQDN Length' and 'Serving UNC FQDN Length' parameters will contain the length of the SGW and UNC FQDNs, respectively. The two FQDNs are then concatenated and included in the 'Data Block' parameter. If IP addresses are used, then the lengths are set to zero and the Data Block parameter is not included.

g) R10 Register Reject

This message may be sent by the SPS to the INC. Table 34 identifies R10 REGISTER REJECT message attributes.

TABLE 34

R10 REGISTER REJECT

| IEI | Information Element | Type/Reference (Note 1) | Presence (Note 1) | Format | Length | Value |
|---|---|---|---|---|---|---|
| | R10 REGISTER REJECT Message Type | Message Type | M | V | 1 | |
| | Length | Message Length | M | V | 2 | Not including Message Type or Length fields |
| | Register Reject Cause | Register Reject Cause 11.2.21 | M | V | 1 | See Note 1 |
| | Location Black List Indicator | Location Black List Indicator 11.2.58 | O | V | 2 | See Note 1 |
| | Location Area Identification | Location Area Identification 11.2.5 | O | V | 6 | See Note 1 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the referenceis to the appropriate section in [UMA P]. Optional (O) parameters (i.e., with significant content) are included by the SPS.

h) R10 Register Update Uplink

This message may be sent by the INC to the SPS. Table 35 identifies R10 REGISTER UPDATE UPLINK message attributes.

TABLE 35

R10 REGISTER UPDATE UPLINK

| IEI | Information Element | Type/Reference (Note 1) | Presence (Note 1) | Format | Length | Value |
|---|---|---|---|---|---|---|
| | R10 REGISTER UPDATE UPLINK Message Type | Message Type | M | V | 1 | |
| | Length | Message Length | M | V | 2 | Not including Message Type or Length fields |
| | IMSI | Mobile Identity 11.2.1 | M | V | 9 | See Note 1 |
| | UMA Release Indicator | UMA Release ndicator 11.2.2 | M | V | 1 | See Note 1 |
| | UMA Classmark | UMA Classmark 11.2.7 | M | V | 1 | See Note 1 |
| | Coverage Indication | GSM Coverage Indicator 11.2.6 | M | V | 1 | See Note 1 |
| | MS Radio identity | Radio Identity 11.2.3 | M | V | 7 | See Note 1 |
| | AP Radio Identity | Radio Identity 11.2.3 | O | V | 8 | See Note 1 |
| | Cell Identity | Cell Identity 11.2.4 | O | V | 3 | See Note 1 |
| | Location Area Identification | Location Area Identification 11.2.5 | O | V | 6 | See Note 1 |
| | Routing Area Code | Routing Area Code 11.2.41 | O | V | 2 | See Note 1 |
| | Geographic Location | Geographical Location 11.2.8 | O | V | 5 | See Note 1 |

TABLE 35-continued

R10 REGISTER UPDATE UPLINK

| IEI | Information Element | Type/Reference (Note 1) | Presence (Note 1) | Format | Length | Value |
|---|---|---|---|---|---|---|
| | AP Location Length | See Note 2 | O | V | 1 | See Note 2 |
| | Data Block | See Note 2 | O | V | 0-1024 | See Note 2 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the referenceis to the appropriate section in [UMA P]. Optional (O) parameters (i.e., with significant content) are included by the INC.
2. If AP location is included then the 'AP Location Length' parameter will contain the length of the AP Location. If present, the AP Location is included in the 'Data Block' parameter. If no AP Location is included, then the length is set to zero and the Data Block parameter is not included.

i) R10 Register Update Downlink

This message may be sent by the SPS to the INC. Table 36 identifies R10 REGISTER UPDATE DOWNLINK message attributes.

TABLE 36

R10 REGISTER UPDATE DOWNLINK

| IEI | Information Element | Type/Reference (Note 1) | Presence (Note 1) | Format | Length | Value |
|---|---|---|---|---|---|---|
| | R10 REGISTER UPDATE DOWNLINK Message Type | Message Type | M | V | 1 | |
| | Length | Message Length | M | V | 2 | Not including Message Type or Length fields |
| | IMSI | Mobile Identity 11.2.1 | M | V | 9 | See Note 1 |
| | Cell Identity | Cell Identity 11.2.4 | O | V | 3 | See Note 1 |
| | Location Area Identification | Location Area Identification 11.2.5 | O | V | 6 | See Note 1 |
| | Location Status | Location Status 11.2.44 | O | V | 2 | See Note 1 |
| | Geographic Location | Geographical Location 11.2.8 | O | V | 5 | See Note 1 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference is tothe appropriate section in [UMA P]. Optional (O) parameters (i.e., with significant content) are included by the SPS.

j) R10 Deregister from INC

This message may be sent by the INC to the SPS. Table 37 identifies R10 DEREGISTER FROM INC message attributes.

TABLE 37

R10 DEREGISTER FROM INC

| IEI | Information Element | Type/Reference (Note 1) | Presence (Note 1) | Format | Length | Value |
|---|---|---|---|---|---|---|
| | R10 DEREGISTER FROM INC Message Type | Message Type | M | V | 1 | |

TABLE 37-continued

R10 DEREGISTER FROM INC

| IEI | Information Element | Type/Reference (Note 1) | Presence (Note 1) | Format | Length | Value |
|---|---|---|---|---|---|---|
| | Length | Message Length | M | V | 2 | Not including Message Type or Length fields |
| | IMSI | Mobile Identity 11.2.1 | M | V | 9 | See Note 1 |
| | Register Reject Cause | Register Reject Cause 11.2.21 | M | V | 1 | See Note 1 |
| | Location Black List indicator | Location Black List Indicator 11.2.58 | O | V | 2 | See Note 1 |
| | Location Area Identification | Location Area Identification 11.2.5 | O | V | 6 | See Note 1 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference isto the appropriate section in [UMA P]. Optional (O) parameters (i.e., with significant content) are included by the INC.

k) R10 Deregister from SPS

This message may be sent by the SPS to the INC. Table 38 identifies R10 DEREGISTER FROM SPS message attributes.

TABLE 38

R10 DEREGISTER FROM SPS

| IEI | Information Element | Type/Reference (Note 1) | Presence (Note 1) | Format | Length | Value |
|---|---|---|---|---|---|---|
| | R10 DEREGISTER FROM SPS Message Type | Message Type | M | V | 1 | |
| | Length | Message Length | M | V | 2 | Not including Message Type or Length fields |
| | IMSI | Mobile Identity 11.2.1 | M | V | 9 | See Note 1 |
| | Register Reject Cause | Register Reject Cause 11.2.21 | M | V | 1 | See Note 1 |
| | Location Black List indicator | Location Black List Indicator 11.2.58 | O | V | 2 | See Note 1 |
| | Location Area Identification | Location Area Identification 11.2.5 | O | V | 6 | See Note 1 |

Notes:
1. Unless otherwise specified, all parameters are always included (in the order listed) and have fixed sizes. However, unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference isto the appropriate section in [UMA P]. Optional (O) parameters (i.e., with significant content) are included by the SPS.

3. Parameters

Each mandatory parameter in the R10 messages follows the format of the UMA counterpart, but without the tag and length fields. Each optional parameter in the R10 messages also follows the format of the UMA counterpart. However, unless otherwise specified, all optional parameters are always included (in the order listed) and have fixed sizes.

Also unless otherwise specified, the first octet of each "optional" parameter represents the length of the significant portion of the remaining parameter contents; i.e., if the first octet is zero, then the remaining octets in the parameter should be disregarded. Otherwise, the parameter types follow the definitions in [UMA P] and the reference is to the appropriate section in [UMA P]. Exceptions to the UMA alignment include the Data Block parameter and the Billing CI and LAI parameters, whose use is described in the message definitions.

4. Procedures a) R10 Discovery Procedures (1) R10 Discovery Request Initiation by the INC This procedure is triggered when the INC receives a URR DISCOVERY REQUEST message and the S1 interface is enabled. The INC relays the contents of the URR DISCOVERY REQUEST message to the SPS in the R10 Discovery Request message using the USCP procedures described in section b) (i.e., in the USC Request message).

(2) R10 Discovery Request Processing by the SPS

The SPS performs one or more of the following procedures when it receives the R10 DISCOVERY REQUEST message from the INC (i.e., starting from the first procedure, then branching as necessary):

1. Discovery UMA Release Indicator check
2. Discovery UMA Classmark check
3. Discovery IMSI Allowed check
4. Discovery IMSI Assigned UNC check
5. Discovery GSM Coverage check
6. Discovery GSM-to-UMA mapping
7. Discovery redirection check
8. Send Discovery Accept
9. Send Discovery Reject (3) Discovery UMA Release Indicator Check Procedure No checking of the UMA Release Indicator is done by the SPS; any necessary screening occurs at the INC. In some variation of this embodiment SPS does the checking of the UMA Release Indicator. The SPS continues with the next procedure.

(4) Discovery UMA Classmark Check Procedure

No checking of the UMA Classmark is done by the SPS. In some variations of this embodiment the SPS may check UMA Classmark. The SPS continues with the next procedure.

(5) Discovery IMSI Allowed Check Procedure

If the 'Check IMSI on Discovery' configuration parameter has value 'No', then the SPS continues with the next procedure.

If the 'Check IMSI on Discovery' configuration parameter has value 'Yes', then the SPS retrieves the subscriber record from the UMA Database Server.

If a subscriber record is found and 'Subscriber Status=Allowed' in the subscriber record then the SPS continues with the Discovery IMSI UNC check procedure.

If no subscriber record is found or 'Subscriber Status=Barred' in the subscriber record then the SPS sets the Discovery Reject Cause to 'IMSI Not Allowed' and continues with the Send Discovery Reject procedure.

If no response is received from the database server (e.g., due to a S2 interface failure condition) or other such error occurs, then the SPS handles this as a case of overload and proceeds by sending USC-RESPONSE with USCP Server State.

(6) Discovery IMSI Assigned UNC Check Procedure

If the subscriber record retrieved in the Discovery IMSI Allowed Check procedure contains UNC assignment information then the SPS uses this information and continues with the Discovery Redirection Check procedure.

(7) Discovery GSM Coverage Check Procedure

The SPS checks the GSM Coverage Indicator, LAI, RAC and CI parameters:

If the GSM Coverage Indicator parameter indicates GSM coverage (i.e., and the LAI, RAC and CI were included in the R10 Discovery Request message) then the SPS continues with the Discovery GSM-to-UMA Mapping procedure with the following inputs:

Mobile Country Code (i.e., MCC from Location Area Identification)

Mobile Network Code (i.e., MNC from Location Area Identification)

Location Area Code (i.e., LAC from Location Area Identification)

Routing Area Code (RAC) from R10 Discovery Request message

Cell Identity (CI) from R10 Discovery Request message

If the GSM Coverage Indicator parameter indicates no GSM coverage but the LAI was included in the R10 Discovery Request message then the SPS continues with the Discovery GSM-to-UMA Mapping procedure with the following inputs:

Mobile Country Code (i.e., MCC from Location Area Identification)

Mobile Network Code (i.e., MNC from Location Area Identification)

Location Area Code (i.e., LAC from Location Area Identification)

Routing Area Code (RAC) indicating that any RAC is acceptable

Cell Identity (CI) indicating that any CI is acceptable

If the GSM Coverage Indicator parameter indicates no GSM coverage and the LAI was not included in the R10 Discovery Request message then the SPS continues with the Discovery GSM-to-UMA Mapping procedure with the following inputs:

Mobile Country Code (i.e., MCC from IMSI)

Mobile Network Code (i.e., MNC from IMSI)

Location Area Code indicating that any LAC is acceptable

Routing Area Code (RAC) indicating that any RAC is acceptable

Cell Identity (CI) indicating that any CI is acceptable (8) Discovery GSM-to-UMA Mapping Procedure The SPS queries the GSM-to-UMA Mapping Table with the inputs from the preceding Discovery GSM Coverage Check procedure. The result of the query should be the UNC assignment information (i.e., main and alternate UNC and SGW IP addresses or FQDNs). In this case, the SPS continues with the Discovery Redirection Check procedure.

The GSM-to-UMA mapping logic must be prepared to find multiple records matching the query inputs and select one (e.g., if multiple INCs serve a particular LAC and there is no static assignment of cells within the LAC to INCs, then this could be based on load balancing of subscribers to the set of found INCs). If mapping is not successful, then the SPS sets the Discovery Reject Cause to 'Unspecified' and continues with the Send Discovery Reject procedure.

(9) Discovery Redirection Check Procedure

If the 'Check Discovery Redirection' configuration parameter has value 'No' or the SPS did not receive the Register Reject Cause parameter from the INC, then the SPS continues with the Send Discovery Accept procedure.

If the 'Check Discovery Redirection' configuration parameter has value 'Yes' and the SPS received the Register Reject Cause parameter from the INC, then the SPS proceeds as follows:

If the Redirection Counter parameter value is greater than the 'Maximum Redirections' configuration parameter, then the SPS sets the Discovery Reject Cause to 'Unspecified' and continues with the Send Discovery Reject procedure.

If the main UNC assignment (i.e., from the mapping table) matches the Default UNC information from the R10 Discovery Request message (i.e., either the IP addresses match or the FQDNs match), then the SPS selects the alternate UNC information and continues with the Send Discovery Accept procedure. If no alternate UNC information is available then the SPS sets the Discovery Reject Cause to 'Unspecified' and continues with the Send Discovery Reject procedure.

If the main UNC assignment (i.e., from the mapping table) does not match the Default UNC information from the R10 Discovery Request message, then the SPS selects the main UNC information and continues with the Send Discovery Accept procedure.

(10) Send Discovery Accept Procedure

The SPS sends the R10 Discovery Accept message to the requesting INC using the USCP procedures described in section b) (i.e., in the USC Response message), including the selected UNC and SGW information (i.e., either IP addresses or FQDNs). The SPS then considers the transaction complete.

(11) Send Discovery Reject Procedure

The SPS sends the R10 Discovery Reject message to the requesting INC using the USCP procedures described in section b) (i.e., in the USC Response message), including the Discovery Reject Cause (i.e., either 'unspecified' or 'IMSI not allowed'). The SPS then considers the transaction complete.

(12) R10 Discovery Response Processing by the INC

When the INC receives the R10 Discovery Accept message from the SPS, it relays the information to the MS in the URR DISCOVERY ACCEPT message and considers the transaction complete. When the INC receives the R10 Discovery Reject message from the SPS, it relays the information to the MS in the URR DISCOVERY REJECT message and considers the transaction complete.

b) Abnormal Cases (1) S1 Communication Error

The INC uses the USC layer to send the request to the SPS. The USC layer handles retries and timeouts and signals the INC in the case of S1 communication error. The INC sends a URR DISCOVERY REJECT message to the MS with the Discovery Reject Cause set to 'Unspecified' and considers the transaction complete.

(2) UNC Congestion

The SPS signals congestion by sending a USC RESPONSE message to the INC and including the USCP Server State parameter set to the value 'Server is in overload state'. The INC sends a URR DISCOVERY REJECT message to the MS with the Discovery Reject Cause set to 'Network Congestion' and considers the transaction complete. Note: The TU3902 timer value (included in URR DISCOVERY REJECT) is part of the INC configuration data, not related to the S1 interface.

c) R10 Registration Procedures (1) R10 Register Request Initiation by the INC

This procedure is triggered when the INC receives a URR REGISTER REQUEST message and the S1 interface is enabled. The INC relays the contents of the URR REGISTER REQUEST message to the SPS in the R10 Register Request message using the USCP procedures described in section b) (i.e., in the USC Request message).

(2) R10 Register Request Processing by the SPS

The SPS performs one or more of the following procedures when it receives the R10 REGISTER REQUEST message from the INC:

1. Register UMA Release Indicator check

2. Register UMA Classmark check

3. Register GSM RR State check

4. Register IMSI allowed check

5. Register GSM CGI Blacklist check

6. Register AP Blacklist check

7. Register GSM Coverage check

8. Register GSM-to-UMA mapping

9. Register redirection check

10. Send Register Accept

11. Send Register Redirect

12. Send Register Reject (3) Register UMA Release Indicator Check Procedure

No checking of the UMA Release Indicator is done by the SPS; any necessary screening occurs at the INC. The SPS continues with the next procedure. In some variations of this embodiment the SPS may check the UMA Release Indicator.

(4) Register UMA Classmark Check Procedure

No checking of the UMA Classmark is done by the SPS. This may change in a future version of the S1 protocol spec. The SPS continues with the next procedure.

(5) Register GSM RR State Check Procedure

No checking of the GSM RR State is done by the SPS. This may change in a future version of the S1 protocol spec. The SPS continues with the next procedure.

(6) Register No GSM Coverage Check Procedure

If the 'Special Handling of No GSM Coverage on Registration' configuration parameter has value 'No', then the SPS continues with the next procedure.

If the 'Special Handling of No GSM Coverage on Registration' configuration parameter has value 'Yes', then the SPS retrieves the subscriber record from the UMA Database Server.

If a subscriber record is found and 'Subscriber Status=Allowed' in the subscriber record then the SPS continues with the next procedure.

If no subscriber record is found or 'Subscriber Status=Barred' in the subscriber record then the SPS sets the Register Reject Cause to 'IMSI Not Allowed' and continues with the Send Register Reject procedure.

If no response is received from the database server (e.g., due to a S2 interface failure condition) or other such error occurs, then the SPS handles this as a case of overload and proceeds by sending USC-RESPONSE with USCP Server State.

(7) Register IMSI Allowed Check Procedure

If the 'Check IMSI on Registration' configuration parameter has value 'No', then the SPS continues with the next procedure.

If the 'Check IMSI on Registration' configuration parameter has value 'Yes', then the SPS retrieves the subscriber record from the UMA Database Server.

If a subscriber record is found and 'Subscriber Status=Allowed' in the subscriber record then the SPS continues with the next procedure.

If no subscriber record is found or 'Subscriber Status=Barred' in the subscriber record then the SPS sets the Register Reject Cause to 'IMSI Not Allowed' and continues with the Send Register Reject procedure.

If no response is received from the database server (e.g., due to a S2 interface failure condition) or other such error occurs, then the SPS handles this as a case of overload and proceeds by sending USC-RESPONSE with USCP Server State.

(8) Register GSM CGI Blacklist Check Procedure

If the 'Check GSM CGI Blacklist on Registration' configuration parameter has value 'No', then the SPS continues with the next procedure.

If the 'Check GSM CGI Blacklist on Registration' configuration parameter has value 'Yes', then:
- If the GSM Coverage Indicator parameter indicates no GSM coverage, then the SPS continues with the next procedure.
- Otherwise the SPS queries the GSM CGI Blacklist database with the following inputs:
  - Mobile Country Code (i.e., MCC from Location Area Identification)
  - Mobile Network Code (i.e., MNC from Location Area Identification)
  - Location Area Code (i.e., LAC from Location Area Identification)
  - Cell Identity (CI) from R10 Discovery Request message
- If there is no match then the SPS continues with the next procedure.
- If there is a match then the SPS sets the Register Reject Cause to 'Location Not Allowed', includes the Location Blacklist Indicator and Location Area Identification parameters, and continues with the Send Register Reject procedure.
- If no response is received from the database server (e.g., due to a S2 interface failure condition) or other such error occurs, then the SPS handles this as a case of overload and proceeds by sending USC-RESPONSE with USCP Server State.

(9) Register AP Blacklist Check Procedure

If the 'Check AP Blacklist on Registration' configuration parameter has value 'No', then the SPS continues with the next procedure.

If the 'Check AP Blacklist on Registration' configuration parameter has value 'Yes', then:
- If the AP Radio Identity parameter is not included in the URR REGISTER REQUEST message, then the SPS continues with the next procedure.
- Otherwise the SPS queries the AP Blacklist database.
- If there is no match then the SPS continues with the next procedure.
- If there is a match then the SPS sets the Register Reject Cause to 'AP Not Allowed' and continues with the Send Register Reject procedure.
- If no response is received from the database server (e.g., due to a S2 interface failure condition) or other such error occurs, then the SPS handles this as a case of overload and proceeds by sending USC-RESPONSE with USCP Server State.

(10) Register AP Check Procedure

If the AP Radio Identity parameter is not included in the URR REGISTER REQUEST message, then the SPS continues with the next procedure.

If the 'Check IMSI on Registration' configuration parameter has value 'Yes', then the SPS retrieves the subscriber record from the UMA Database Server.
- If a subscriber record is found and 'Subscriber Status=Allowed' in the subscriber record then the SPS continues with the next procedure.
- If no subscriber record is found or 'Subscriber Status=Barred' in the subscriber record then the SPS sets the Register Reject Cause to 'IMSI Not Allowed' and continues with the Send Register Reject procedure.
- If no response is received from the database server (e.g., due to a S2 interface failure condition) or other such error occurs, then the SPS handles this as a case of overload and proceeds to send USC-RESPONSE with USCP Server State.

If the subscriber record retrieved in the Discovery IMSI Allowed Check procedure contains UNC assignment information then the SPS uses this information and continues with the Discovery Redirection Check procedure.

(11) Register GSM Coverage Check Procedure

The SPS checks the GSM Coverage Indicator, LAI, RAC and CI parameters:
- If the GSM Coverage Indicator parameter indicates GSM coverage (i.e., and the LAI, RAC and CI were included in the R10 Discovery Request message) then the SPS continues with the Discovery GSM-to-UMA Mapping procedure with the following inputs:
  - Mobile Country Code (i.e., MCC from Location Area Identification)
  - Mobile Network Code (i.e., MNC from Location Area Identification)
  - Location Area Code (i.e., LAC from Location Area Identification)
  - Routing Area Code (RAC) from R10 Discovery Request message
  - Cell Identity (CI) from R10 Discovery Request message
- If the GSM Coverage Indicator parameter indicates no GSM coverage but the LAI was included in the R10 Discovery Request message then the SPS continues with the Discovery GSM-to-UMA Mapping procedure with the following inputs:
  - Mobile Country Code (i.e., MCC from Location Area Identification)
  - Mobile Network Code (i.e., MNC from Location Area Identification)
  - Location Area Code (i.e., LAC from Location Area Identification)
  - Routing Area Code (RAC) indicating that any RAC is acceptable
  - Cell Identity (CI) indicating that any CI is acceptable
- If the GSM Coverage Indicator parameter indicates no GSM coverage and the LAI was not included in the R10 Discovery Request message then the SPS continues with the Discovery GSM-to-UMA Mapping procedure with the following inputs:
  - Mobile Country Code (i.e., MCC from IMSI)
  - Mobile Network Code (i.e., MNC from IMSI)
  - Location Area Code indicating that any LAC is acceptable
  - Routing Area Code (RAC) indicating that any RAC is acceptable
  - Cell Identity (CI) indicating that any CI is acceptable

(12) Register GSM-to-UMA Mapping Procedure

The SPS queries the GSM-to-UMA Mapping Table with the inputs from the preceding Discovery GSM Coverage Check procedure.

The result of the query should be the UNC assignment information (i.e., main and alternate UNC and SGW IP addresses or FQDNs). In this case, the SPS continues with the Discovery Redirection Check procedure.

Note that the GSM-to-UMA mapping logic must be prepared to find multiple records matching the query inputs and select one (e.g., if multiple INCs serve a particular LAC and there is no static assignment of cells within the LAC to INCs, then this could be based on load balancing of subscribers to the set of found INCs).

If mapping is not successful, then the SPS sets the Discovery Reject Cause to 'Unspecified' and continues with the Send Discovery Reject procedure.

(13) Register Redirection Check Procedure

If the 'Check Discovery Redirection' configuration parameter has value 'No' or the SPS did not receive the Register Reject Cause parameter from the INC, then the SPS continues with the Send Discovery Accept procedure.

If the 'Check Discovery Redirection' configuration parameter has value 'Yes' and the SPS received the Register Reject Cause parameter from the INC, then the SPS proceeds as follows:

If the Redirection Counter parameter value is greater than the 'Maximum Redirections' configuration parameter, then the SPS sets the Discovery Reject Cause to 'Unspecified' and continues with the Send Discovery Reject procedure.

If the main UNC assignment (i.e., from the mapping table) matches the Default UNC information from the R10 Discovery Request message (i.e., either the IP addresses match or the FQDNs match), then the SPS selects the alternate UNC information and continues with the Send Discovery Accept procedure.

If the main UNC assignment (i.e., from the mapping table) does not match the Default UNC information from the R10 Discovery Request message, then the SPS selects the main UNC information and continues with the Send Discovery Accept procedure.

(14) Send Register Accept Procedure

The SPS sends the R10 Discovery Accept message to the requesting INC using the USCP procedures described in section b) (i.e., in the USC Response message), including the selected UNC and SGW information (i.e., either IP addresses or FQDNs). The SPS then considers the transaction complete.

(15) Send Register Reject Procedure

The SPS sends the R10 Discovery Reject message to the requesting INC using the USCP procedures described in section b) (i.e., in the USC Response message), including the Discovery Reject Cause. If the Discovery Reject Cause is 'Network Congestion' then the SPS also includes the TU3902 configuration parameter value. The SPS then considers the transaction complete.

(16) R10 Register Response Processing by the INC

When the INC receives the R10 Discovery Accept message from the SPS, it relays the information to the MS in the URR DISCOVERY ACCEPT message and considers the transaction complete. When the INC receives the R10 Discovery Reject message from the SPS, it relays the information to the MS in the URR DISCOVERY REJECT message and considers the transaction complete.

d) Abnormal Cases (1) Unspecified UNC Error

The INC sends a URR DISCOVERY REJECT message to the MS with the Discovery Reject Cause set to 'Unspecified' and considers the transaction complete.

(2) UNC Congestion

The INC sends a URR DISCOVERY REJECT message to the MS with the Discovery Reject Cause set to 'Unspecified' and considers the transaction complete.

E. Configuration Parameters

1. INC Parameters

Table 39 summarizes the configuration parameters that apply to the S1 interface at the INC.

TABLE 39 configuration parameters that apply to the S1 interface at the INC

| Name | Format | Values | Default |
| --- | --- | --- | --- |
| USCP Port Number | Binary | Any valid UDP port | 18200 |
| Primary SPS FQDN | ASCII | Any valid FQDN | None |
| Secondary SPS FQDN | ASCII | Any valid FQDN | None |
| Primary SPS Address | Binary | Any valid IPv4 address | None |
| Secondary SPS Address | Binary | Any valid IPv4 address | None |
| Ts1 Timer | Binary | 1-10 seconds | 5 sec. |

2. SPS Parameters

Table 40 summarizes the configuration parameters that apply to the S1 interface at the SPS.

TABLE 40 configuration parameters that apply to the S1 interface at the SPS

| Name | Format | Values | Default |
| --- | --- | --- | --- |
| USCP Port Number | Binary | Any valid UDP port | 18200 |
| Check IMSI on Discovery | Boolean | Yes or No | No |
| Check Discovery Redirection | Boolean | Yes or No | Yes |
| Maximum Redirections | Binary | 0-7 | 2 |
| Check GSM CGI Blacklist on Registration | Boolean | Yes or No | No |
| Check AP Blacklist on Registration | Boolean | Yes or No | No |

VIII. DEFINITIONS AND ABBREVIATIONS

The following is a list of abbreviations used:
3GPP The 3rd Generation Partnership Project
AAA Authorization, Authentication and Accounting
AP Access Point
ATM Asynchronous Transfer Mode
ATM VC ATM Virtual Circuit
BAS Broadband Access System
BB Broadband
BRAS Broadband Remote Access System (e.g., Redback Networks SMS)
BSC Base station Controller
BSS Base Station Subsystem
BTS Base Transceiver Station
CGI Cell Global Identification
CM Connection Management
CVSD Continuous Variable Slope Delta modulation
DSL Digital Subscriber Line
DSLAM DSL Access Multiplexer
FQDN Fully Qualified Domain Name
GPRS General Packet Radio Service
GSM Global System for Mobile Communication
HLR Home Location Register
IBS Indoor Base Station
IE Information Element
IEP IAN Encapsulation Protocol
IMP IAN Management Protocol
IMSI International Mobile Subscriber Identity
INC Indoor Network Controller IP Internet Protocol
ISP IP Internet Service Provider's IP Network (i.e., typically provided by broadband service provider)
ITP IAN Transfer Protocol
MAC Media Access Control
MG Media Gateway
MM Mobility Management
MS Mobile Station
MSC Mobile Switching Center
NAT Network Address Translation
NAPT Network Address and Port Translation
PCM Pulse Code Modulation
PLMN Public Land Mobile Network
PPP Point-to-Point Protocol
PPPoE PPP over Ethernet protocol
RADIUS Remote Access Dial In User Service
RFC Request for Comment
RR Radio Resource Management
RTP Real Time Protocol
RTCP Real Time Control Protocol
SCO Synchronous Connection-Oriented
SGSN Serving GPRS Switch Node
SGW Security Gateway
SMI Structure of Management Information
SSID service set identifier
TCP Transmission Control Protocol
UDP User Datagram Protocol
UMA Unlicensed Mobile Access
UMAN UMA Network
UNC UMA Network Controller
URR UMA Radio Resource Management
VSA Vendor Specific Attribute
WLAN Wireless Local Area Network
WSP IP Wireless Service Provider's IP Network (i.e., provider of IAN service)

While the invention has been described with reference to numerous specific details, one of ordinary skill in the art will recognize that the invention can be embodied in other specific forms without departing from the spirit of the invention. For instance, protocols other than RADIUS or USCP may be used. Also, the attributes values (e.g., the Vendor-Specific attributes, VSAs), length of the fields, type codes, default port values, and other similar values may be changed. Also, the specific sequencing of procedures described and their associated attributes may be modified. Thus, one of ordinary skill in the art would understand that the invention is not to be limited by the foregoing illustrative details, but rather is to be defined by the appended claims.

What is claimed is:

1. A method of performing register transactions for a first wireless communication system comprising a network controller, wherein the network controller comprises an IP network controller (INC) communicatively coupled to a second wireless communication system, wherein the network controller comprises a security gateway communicatively coupled to the INC, the method comprising:
   a) authenticating a client device into the network controller by a first server communicatively coupled to the security gateway;
   b) sending a register request message from the client device to the INC through the security gateway;
   c) sending a set of attributes from the INC to a second server;
   d) authorizing said register request by the second server utilizing a set of databases; and
   e) sending a result of said authorization from the second server to the INC.

2. The method of claim 1, wherein said authorization of the register request by the second server comprises:
   when the second server is configured to check a subscriber's international mobile subscriber identity (IMSI) on register request:
      a) retrieving a subscriber record by the second server from a database server; and
      b) setting by the second server a register reject cause to IMSI not allowed when no subscriber record is found or a subscriber status was set to barred.

3. The method of claim 1, wherein said authorization of the register request by the second server comprises:
   when no response is received from the database server:
      a) setting a register reject cause to network congestion by the second server; and
      b) assigning a value to a timer to cause the client device to delay sending another register request.

4. The method of claim 1, wherein the first wireless communication system further comprises an access point (AP), wherein said authorization of the register request by the second server comprises retrieving a subscriber record by the second server from a database server when the second server is configured to check AP on register.

5. The method of claim 4, wherein said authorization of the register request by the second server further comprises setting by the second server a register reject cause to AP not allowed when a subscriber record is found and the AP is not listed as a valid AP.

6. The method of claim 4, wherein the client device is a mobile station (MS), wherein the register request comprises a MS radio identity attribute and an AP radio identity attribute, wherein an AP is valid when the AP radio identity corresponds to a valid location in a subscriber record associated with the MS.

7. The method of claim 4, wherein the client device is not a mobile station (MS), wherein an AP is valid when the register request comprises a MS radio identity attribute that corresponds to a valid location in a subscriber record associated with the client device.

8. The method of claim 7, wherein the client device is a fixed terminal adaptor.

9. The method of claim 8, wherein the MS radio identity attribute is a MAC address of the fixed terminal adaptor.

10. The method of claim 4, wherein said authorization of the register request by the second server further comprises:
   a) setting a register reject cause to network congestion by the second server when no response was received by the second server from the database server; and
   b) assigning a value to a timer to cause the client device to delay sending another register request request.

11. The method of claim 4, wherein said authorization of the register request by the second server further comprises setting by the second server a register reject cause to IMSI not allowed when no subscriber record is found or a subscriber status was set to barred.

12. The method of claim 1, wherein sending the result of said authorization comprises sending a register accept message from the second server to the INC.

13. The method of claim 1 further comprising storing a current location of the client device.

14. The method of claim 13 further comprising:
   a) determining that a deregistration of the client device is required;
   b) sending a message to the second server indicating a deregistration transaction;
   c) updating the current location of the client device; and d) receiving a deregister accept message at the INC from the second server.

15. The method of claim 12, wherein the register accept message comprises a geographical location, the method further comprising storing the geographical location as a current location of the client device.

16. The method of claim 12, wherein the register accept message comprises a location status, the method further comprising:
   a) storing the location status by the INC; and
   b) sending the location status to the client device.

17. The method of claim 1, wherein the second server is an authorization, authentication, and accounting (AAA) server.

18. The method of claim 1, wherein the INC and the second server communicate by utilizing the remote access dial-in user service (RADIUS) protocol.

19. The method of claim 1, wherein sending the result of said authorization comprises sending a register reject message comprising a rejection cause from the second server to the INC.

20. A network controller comprising:
   a) a security gateway communicatively coupled to a first server for authentication of a mobile station (MS) into the network controller; and
   b) an IP network controller (INC) communicatively coupled to a licensed wireless communication system and communicatively coupled to the security gateway;
   wherein the INC is for:
      i) receiving a register request message from the MS through the security gateway;
      ii) sending a set of attributes to a second server for authorizing said register request by the second server utilizing a set of databases; and
      iii) receiving a result of said authorization from the second server.

21. The network controller of claim 20, wherein the INC is further for receiving from the second server a reject message with a cause field, said cause field set to international mobile subscriber identity (IMSI) not allowed when:
   i) the second server is configured to check a subscriber's IMSI on register request; and
   ii) no subscriber record is found or a subscriber status was set to barred.

22. The network controller of claim 20, wherein the security gateway is communicatively coupled to an access point (AP), wherein the INC is further for receiving from the second server a reject message with a cause field, said cause field set to AP not allowed when:
   i) the second server is configured to check AP on register;
   ii) a subscriber record is found; and
   iii) the AP is not listed as a valid AP.

23. The network controller of claim 22, wherein said cause field is set to international mobile subscriber identity (IMSI) not allowed when no subscriber record is found or a subscriber status was set to barred.

24. The network controller of claim 20, wherein the second server is an authorization, authentication, and accounting (AAA) server.

25. The network controller of claim 20, wherein the INC and the second server communicate by utilizing the remote access dial-in user service (RADIUS) protocol.

* * * * *